(12) United States Patent
Van Kann

(10) Patent No.: US 8,789,415 B2
(45) Date of Patent: Jul. 29, 2014

(54) GRAVITY GRADIOMETER

(75) Inventor: Frank Joachim Van Kann, Nedlands (AU)

(73) Assignee: Technological Resources Pty. Ltd., Melbourne, Victoria (AU)

( * ) Notice: Subject to any disclaimer, the term of this patent is extended or adjusted under 35 U.S.C. 154(b) by 577 days.

(21) Appl. No.: 13/001,696

(22) PCT Filed: Sep. 25, 2009

(86) PCT No.: PCT/AU2009/001282
§ 371 (c)(1),
(2), (4) Date: Feb. 24, 2011

(87) PCT Pub. No.: WO2010/034075
PCT Pub. Date: Apr. 1, 2010

(65) Prior Publication Data
US 2011/0138909 A1 Jun. 16, 2011

(30) Foreign Application Priority Data

Sep. 25, 2008 (AU) .................................. 2008904995
Sep. 25, 2008 (AU) .................................. 2008904996
Sep. 25, 2008 (AU) .................................. 2008904997

(51) Int. Cl.
*G01V 7/10* (2006.01)

(52) U.S. Cl.
USPC ....................................................... 73/382 G

(58) Field of Classification Search
CPC .............. G01V 7/00; G01V 7/10; G01V 7/16
USPC ............ 73/382 G, 382 R; 33/366.11, 366.13, 33/366.25, 366.26
See application file for complete search history.

(56) References Cited

U.S. PATENT DOCUMENTS 2,809,524 A * 10/1957 Masterson .................. 73/382 R
3,545,266 A * 12/1970 Wilson ........................ 73/152.54
(Continued)

FOREIGN PATENT DOCUMENTS

CA 2 478 504 9/2003
CA 2.427 115 10/2004
(Continued)

OTHER PUBLICATIONS

M. V. Moody ("A superconducting gravity gradiometer for measurements from a moving vehicle", AIP Review of Scientific Instruments, 2011).*

(Continued)

*Primary Examiner* — Peter Macchiarolo
*Assistant Examiner* — Samir M Shah
(74) *Attorney, Agent, or Firm* — Banner & Witcoff, Ltd.

(57) ABSTRACT

The present disclosure provides a gravity gradiometer that comprises a detector for detecting a gravity gradient. The detector comprises at least one movable sensing element and that is arranged to generate a signal in response to a change in gravity gradient. The gravity gradiometer also comprises a support structure for supporting the detector in an aircraft and a component that is arranged to reduce transmission of an aircraft acceleration to the detector. The at least one movable sensing element and the support structure together are arranged to reduce an influence of the aircraft acceleration on the signal by a factor of at least $10^7$ when the gravity gradiometer is airborne and exposed to the aircraft acceleration.

16 Claims, 25 Drawing Sheets

(56) References Cited

U.S. PATENT DOCUMENTS

| | | | |
|---|---|---|---|
| 3,926,054 A * | 12/1975 | Buck | 73/382 R |
| 4,497,206 A | 2/1985 | Scheurenbrand | |
| 4,513,618 A | 4/1985 | Lautzenhiser | |
| 4,841,772 A * | 6/1989 | Paik | 73/382 G |
| 4,935,883 A | 6/1990 | Hulsing, II | |
| 4,992,656 A * | 2/1991 | Clauser | 250/251 |
| 5,333,095 A | 7/1994 | Stevenson et al. | |
| 5,505,555 A | 4/1996 | Van Kann et al. | |
| 5,587,526 A | 12/1996 | Lumley et al. | |
| 5,668,315 A * | 9/1997 | Van Kann et al. | 73/382 G |
| 5,728,935 A * | 3/1998 | Czompo | 73/382 G |
| 5,777,226 A | 7/1998 | Ip | |
| 5,791,598 A * | 8/1998 | Rodden et al. | 244/165 |
| 5,804,722 A * | 9/1998 | Van Kann et al. | 73/382 G |
| 5,817,939 A * | 10/1998 | Lumley et al. | 73/382 R |
| 5,922,951 A * | 7/1999 | O'Keefe et al. | 73/382 G |
| 5,962,781 A * | 10/1999 | Veryaskin | 73/382 G |
| 6,082,194 A * | 7/2000 | Gladwin | 73/382 G |
| 6,125,698 A * | 10/2000 | Schweitzer et al. | 73/382 G |
| 6,212,952 B1 * | 4/2001 | Schweitzer et al. | 73/382 G |
| 6,494,091 B2 * | 12/2002 | Couture | 73/382 R |
| 6,526,825 B2 * | 3/2003 | Manson | 73/382 R |
| 6,612,171 B1 * | 9/2003 | Stephenson et al. | 73/382 R |
| 6,615,660 B1 * | 9/2003 | Feinberg et al. | 73/382 R |
| 6,658,935 B1 * | 12/2003 | Feinberg | 73/382 G |
| 6,668,646 B1 * | 12/2003 | Davies et al. | 73/382 R |
| 6,799,459 B2 * | 10/2004 | Dosch et al. | 73/382 G |
| 6,837,106 B2 * | 1/2005 | Etkin et al. | 73/382 G |
| 6,883,372 B2 * | 4/2005 | van Leeuwen et al. | 73/382 G |
| 7,181,967 B2 * | 2/2007 | Lee | 73/382 G |
| 7,305,879 B2 * | 12/2007 | Moody et al. | 73/382 R |
| 7,360,419 B2 * | 4/2008 | French et al. | 73/382 G |
| 7,444,867 B2 * | 11/2008 | Brett et al. | 73/382 R |
| 7,559,149 B2 * | 7/2009 | Van Kann | 33/366.25 |
| 7,562,460 B2 * | 7/2009 | Van Kann et al. | 33/366.25 |
| 7,562,461 B2 * | 7/2009 | Van Kann | 33/366.25 |
| 7,571,547 B2 * | 8/2009 | Van Kann et al. | 33/366.25 |
| 7,581,327 B2 * | 9/2009 | Van Kann et al. | 33/366.25 |
| 7,584,544 B2 * | 9/2009 | Van Kann et al. | 33/366.25 |
| 7,596,876 B2 * | 10/2009 | Van Kann | 33/366.25 |
| 7,624,635 B2 * | 12/2009 | Van Kann et al. | 73/382 R |
| 7,627,954 B2 * | 12/2009 | Van Kann et al. | 33/366.24 |
| 7,637,153 B2 * | 12/2009 | Van Kann et al. | 73/382 G |
| 7,714,584 B2 * | 5/2010 | Van Kann | 324/330 |
| 7,784,343 B2 * | 8/2010 | Van Kann et al. | 73/382 G |
| 7,788,974 B2 * | 9/2010 | Van Kann et al. | 73/382 R |
| 7,788,975 B2 * | 9/2010 | Brett et al. | 73/382 R |
| 7,814,790 B2 * | 10/2010 | Van Kann | 73/382 G |
| 7,823,448 B2 * | 11/2010 | Van Kann et al. | 73/382 G |
| 7,823,449 B2 * | 11/2010 | Van Kann et al. | 73/382 G |
| 7,849,739 B2 * | 12/2010 | Van Kann et al. | 73/382 G |
| 7,938,003 B2 * | 5/2011 | Van Kann et al. | 73/382 G |
| 7,942,054 B2 * | 5/2011 | Van Kann et al. | 73/382 G |
| 7,975,544 B2 * | 7/2011 | Van Kann et al. | 73/382 G |
| 7,980,130 B2 * | 7/2011 | Kann et al. | 73/382 G |
| 8,033,170 B2 * | 10/2011 | Van Kann | 73/382 G |
| 8,069,725 B2 * | 12/2011 | Moody | 73/383 |
| 8,074,515 B2 * | 12/2011 | Van Kann et al. | 73/382 G |
| 8,201,448 B2 * | 6/2012 | French et al. | 73/383 |
| 8,230,737 B2 * | 7/2012 | Cao | 73/382 R |
| 8,359,920 B2 * | 1/2013 | Meyer | 73/382 G |
| 8,375,785 B2 * | 2/2013 | Metzger et al. | 73/382 G |
| 2002/0092350 A1 * | 7/2002 | Etkin et al. | 73/382 G |
| 2003/0033086 A1 * | 2/2003 | Lee et al. | 702/5 |
| 2003/0209070 A1 * | 11/2003 | Dosch et al. | 73/382 G |
| 2004/0211255 A1 * | 10/2004 | Leeuwen et al. | 73/382 G |
| 2005/0116717 A1 * | 6/2005 | Dransfield et al. | 324/331 |
| 2005/0126287 A1 | 6/2005 | Malametz | |
| 2005/0160815 A1 * | 7/2005 | Lee | 73/514.15 |
| 2005/0211255 A1 | 9/2005 | Matsuoka | |
| 2005/0236909 A1 * | 10/2005 | Baker, Jr. | 310/10 |
| 2006/0117848 A1 * | 6/2006 | Raffalt | 73/313 |
| 2006/0156810 A1 * | 7/2006 | Brett et al. | 73/382 G |
| 2006/0207326 A1 * | 9/2006 | Moody et al. | 73/382 R |
| 2006/0277993 A1 * | 12/2006 | Wang et al. | 73/383 |
| 2007/0051175 A1 | 3/2007 | French et al. | |
| 2008/0115374 A1 * | 5/2008 | Van Kann et al. | 33/366.11 |
| 2008/0115375 A1 * | 5/2008 | Van Kann | 33/366.25 |
| 2008/0115376 A1 * | 5/2008 | Van Kann | 33/366.25 |
| 2008/0115377 A1 * | 5/2008 | Van Kann | 33/366.25 |
| 2008/0115578 A1 * | 5/2008 | Van Kann et al. | 73/382 G |
| 2008/0116905 A1 * | 5/2008 | Van Kann | 324/686 |
| 2008/0120858 A1 * | 5/2008 | Van Kann et al. | 33/366.25 |
| 2008/0121035 A1 * | 5/2008 | Van Kann et al. | 73/382 G |
| 2008/0121036 A1 * | 5/2008 | Van Kann et al. | 73/382 G |
| 2008/0121037 A1 * | 5/2008 | Van Kann et al. | 73/382 G |
| 2008/0122435 A1 * | 5/2008 | Van Kann et al. | 324/207.15 |
| 2008/0163682 A1 * | 7/2008 | Van Kann et al. | 73/382 G |
| 2008/0173090 A1 * | 7/2008 | Van Kann et al. | 73/383 |
| 2008/0236277 A1 * | 10/2008 | Van Kann et al. | 73/382 G |
| 2008/0257038 A1 * | 10/2008 | Van Kann et al. | 73/382 G |
| 2008/0282796 A1 * | 11/2008 | Van Kann et al. | 73/382 G |
| 2008/0302179 A1 * | 12/2008 | Van Kann et al. | 73/382 G |
| 2008/0302180 A1 * | 12/2008 | Van Kann et al. | 73/382 G |
| 2008/0307883 A1 * | 12/2008 | Van Kann et al. | 73/382 G |
| 2009/0044621 A1 * | 2/2009 | Brett et al. | 73/382 R |
| 2009/0260433 A1 * | 10/2009 | Van Kann et al. | 73/383 |
| 2009/0293611 A1 * | 12/2009 | Van Kann et al. | 73/382 R |
| 2010/0005882 A1 * | 1/2010 | Van Kann | 73/382 G |
| 2010/0071462 A1 * | 3/2010 | Van Kann | 73/382 R |
| 2010/0095765 A1 * | 4/2010 | Van Kann et al. | 73/382 G |
| 2010/0095766 A1 * | 4/2010 | Van Kann et al. | 73/382 G |
| 2010/0107756 A1 * | 5/2010 | Van Kann et al. | 73/382 G |
| 2010/0154536 A1 * | 6/2010 | Van Kann et al. | 73/382 G |
| 2010/0154537 A1 * | 6/2010 | Van Kann et al. | 73/382 G |
| 2011/0138909 A1 | 6/2011 | Van Kann | |
| 2011/0162449 A1 * | 7/2011 | Van Kann | 73/382 G |
| 2011/0265563 A1 | 11/2011 | Van Kann | |

FOREIGN PATENT DOCUMENTS

| | | |
|---|---|---|
| EP | 0 200 958 | 12/1986 |
| WO | WO-02/44757 A2 | 6/2002 |
| WO | WO 02/44757 A2 | 6/2002 |
| WO | WO 03/076970 | 9/2003 |
| WO | WO 2007/038818 A1 | 4/2007 |
| WO | WO 2007/038822 A1 | 4/2007 |
| WO | WO 2008/061281 A1 | 5/2008 |

OTHER PUBLICATIONS

Mark Helm Dransfield ("Airborne Gravity Gradiometry", The University of Western Australia, Department of Physics, 1994).*

F J van Kann ("An Airborne Cryogenic Gravity Gradiometer for Geophysical Exploration", The University of Western Australia, Department of Physics, May 1992).*

M. Vol Moody et al. ("Three-axis superconducting gravity gradiometer for sensitive gravity experiments", Review of Scientific Instruments, vol. 73, No. 11, Nov. 2002).*

Bent Ziegler et al. ("Drag-Free Motion Control of Satellite for High-Precision Gravity Field Mapping", Proceedings of the 2002 IEEE International Conference on Control Applications, Technical University of Denmark, Sep. 18-20, 2002).*

P Touboul et al. ("The Microscope experiment, ready for the in-orbit test of the equivalence principle", Class Quantum Grav. 29 (2012), France, Aug. 15, 2012).*

International Search Report in International Application No. PCT/AU2009/001282; Mailing Date: Dec. 9, 2009.

International Preliminary Report on Patentability in International Application No. PCT/AU2009/001282; Mailing Date: Nov. 25, 2010.

M.V. Moody et al., "A Superconducting Gravity Gradiometer for Inertial Navigation,"Position Location and Navigation Symposium 2004, pp. 775-781 (Apr. 26-29, 2004).

International (PCT) Preliminary Report on Patentability in International Application No. PCT/AU2009/001280; Mailing Date: Mar. 29, 2011.

* cited by examiner

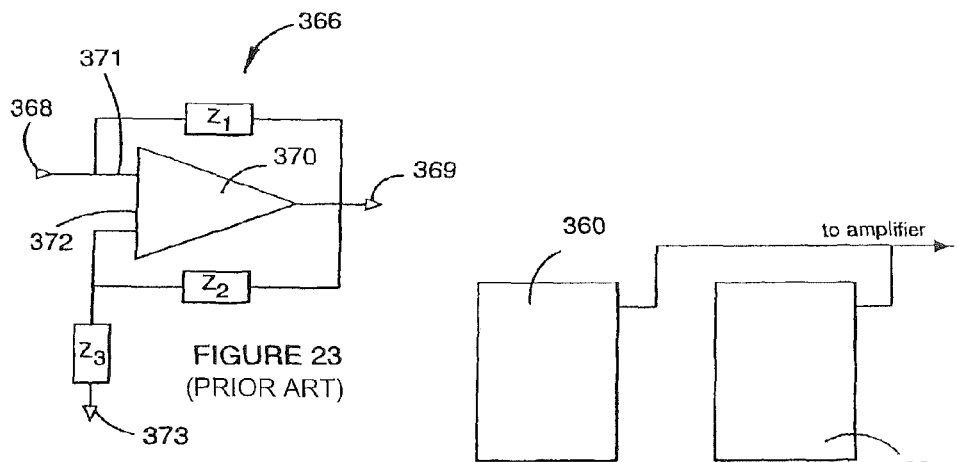
FIGURE 23
(PRIOR ART)
FIGURE 24
(PRIOR ART)
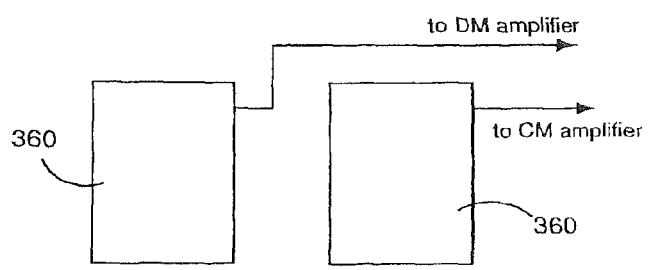
FIGURE 25
(PRIOR ART)
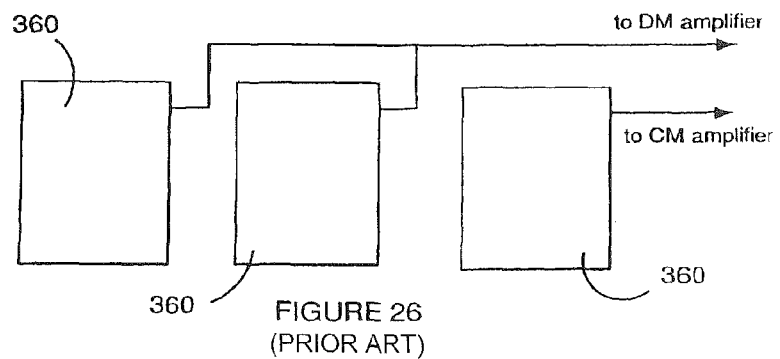
FIGURE 26
(PRIOR ART)

GRAVITY GRADIOMETER

CROSS-REFERENCE TO RELATED APPLICATIONS

This application is a national phase application of International Application No. PCT/AU2009/001282, filed Sep. 25, 2009, and claims the priority of Australian Application Nos. 2008904996, filed Sep. 25, 2008, 2008904997, filed Sep. 25, 2008, and 2008904995, filed September 2008, the contents of all of which are incorporated herein by reference.

FIELD OF THE INVENTION

The present invention relates to a gravity gradiometer.

BACKGROUND OF THE INVENTION

Gravimeters are used in geological exploration to measure the first derivatives of the earth's gravitational field. Whilst some advances have been made in developing gravimeters which can measure the first derivatives of the earth's gravitational field, because of the difficulty in distinguishing spatial variations of the field from temporal fluctuations of accelerations of a moving vehicle, these measurements can usually be made to sufficient precision for useful exploration only with land-based stationary instruments.

Gravity gradiometers (as distinct from gravimeters) are used to measure the second derivative of the gravitational field and use a sensor which is required to measure the differences between gravitational forces down to one part in $10^{12}$ of normal gravity.

A gravity gradiometer typically has a sensor in the form of at least one sensor mass that experiences a change in torque in response to a change in gravity gradient.

Gravity gradiometers have been used to attempt to locate deposits such as ore deposits including iron ore and geological structures bearing hydrocarbons. It would be convenient if gravity gradiometers could be positioned in aircrafts for such analyses. However, aircraft accelerations result in torques that are much larger that those associated with the gravity gradient. A reduction of an influence of such aircraft accelerations on the sensor provides a technological challenge.

SUMMARY OF THE INVENTION

The present invention provides in a first aspect a gravity gradiometer comprising:
 a detector for detecting a gravity gradient, the detector comprising at least one movable sensing element and being arranged to generate a signal in response to a change in gravity gradient;
 a support structure for supporting the detector in an aircraft and comprising a component that is arranged to reduce transmission of an aircraft acceleration to the detector;
 wherein the at least one movable sensing element and the support structure together are arranged to reduce an influence of the aircraft acceleration on the signal by a factor of at least $10^7$ when the gravity gradiometer is airborne and exposed to the aircraft acceleration.

The at least one moveable sensing element may be provided in the form of at least two sensor masses that experience a change in torque in response to a change in gravity gradient whereby the at least two sensor masses move relative to each other and wherein the signal is indicative of the relative movement of the at least two sensor masses.

The support structure may be arranged to reduce the influence of the aircraft acceleration on the signal by a factor of at least $10^3$ and the at least two sensor masses may be arranged to reduce the influence of the aircraft acceleration on the signal by a factor of at least $10^3$.

The support structure may comprise a feed-back control arrangement that is arranged to reduce an influence of the aircraft acceleration on the signal by a factor of at least $10^2$ or at least $10^3$.

The support structure may also comprise a feed-forward control arrangement that is arranged to reduce an influence of the aircraft acceleration on the signal by a factor within the range of 5-100, typically of the order of 10 or at least 5.

The at least one sensor element and the support structure together may be arranged to reduce the influence of the aircraft acceleration on the signal by a factor of at least $5 \times 10^7$ or even $10^8$.

In one embodiment the at least one sensor element is arranged for rotation about an axis and in a manner such that a centre of mass of the at least one sensing element is within 10 nm or even 5 nm of the axis.

The gravity gradiometer comprises in one embodiment an acceleration sensor for sensing an acceleration and an actuator for generating a force as a function of both an acceleration sensed by the acceleration sensor and an adjustment parameter that is dependent a mechanical responsiveness of a detector component to an applied force, the detector component including the detector, the actuator being arranged to apply a generated force such that an influence of the aircraft acceleration on the signal is reduced.

The gravity gradiometer may comprise a further acceleration sensor for sensing the acceleration and the actuator may further arranged to generate a force in response to an acceleration sensed by the further acceleration sensor and wherein the further acceleration sensor and the actuator are arranged in a feed-back arrangement.

Alternatively, the gravity gradiometer may comprise a further acceleration sensor for sensing the acceleration and a further actuator for generating a force in response to an acceleration sensed by the further acceleration sensor, and the further acceleration sensor and the further actuator may be arranged in a feed-back arrangement.

The aircraft acceleration may comprise a linear acceleration component. The at least one movable sensing element may balanced to reduce an influence of the linear aircraft acceleration component on the signal by a factor of at least $10^6$ or even $10^7$ when the gravity gradiometer is airborne and exposed to the aircraft acceleration.

The aircraft acceleration may also comprise linear and angular acceleration components. The gravity gradiometer may comprise at least two moveable sensing masses which are arranged to reduce an influence of the aircraft angular acceleration component on the signal by a factor of at least $10^3$ when the gravity gradiometer is airborne and exposed to the aircraft acceleration in the aircraft.

The at least two movable sensing masses and the support structure together may be arranged to reduce an influence of both the linear and the angular aircraft acceleration components on the signal by a factor of at least $10^7$ when the gravity gradiometer is airborne and exposed to the aircraft acceleration.

The support structure may comprise a first support structure component and a second support structure component and the first support structure component may be arranged to support the second support structure component. One of the first and second support structure components may be arranged to reduce an influence of the aircraft acceleration on the signal by a factor of at least $0.5 \times 10^1$ and the other one of the first and second support structure components may be arranged to reduce an influence of the aircraft acceleration on the signal by a factor of at least $10^2$.

The present invention provides in a second aspect a method of detecting a gravity gradient signal, the gravity gradiometer comprising a detector comprising at least one movable sensing element and being arranged to generate a signal in response to a change in gravity gradient, the method comprising the steps of:

supporting the detector in an aircraft using a support structure;

reducing an influence of an aircraft acceleration; and detecting the gravity gradient signal;

wherein the at least one movable sensing element and the support structure together are arranged to reduce an influence of the aircraft acceleration on the signal by a factor of at least $10^7$ or even $10^8$ when the gravity gradiometer is airborne and exposed to the aircraft acceleration.

The present invention provides in a third aspect gravity gradiometer arranged for airborne operation and arranged such that an influence of an aircraft acceleration on a signal from the gravity gradiometer is reduced by a factor of at least $10^7$ when the gravity gradiometer is airborne and exposed to the aircraft acceleration, the gravity gradiometer comprising:

a detector for detecting a gravity gradient, the detector comprising at least one movable sensing element and being arranged to generate a signal in response to a change in gravity gradient;

an internal support structure supporting the detector;

an external support structure supporting the internal support structure;

wherein a compensation of the internal support structure for the impact of aircraft acceleration is selected to be in the range $1 \times 10^3 - 1 \times 10^4$ and wherein a compensation of the external support structure for an impact of aircraft acceleration is selected to be in the range $0.5 \times 10^1 - 1 \times 10^2$, and wherein an arrangement of the at least one movable sensing element is selected such that the influence of the aircraft acceleration on the at least one sensing element is reduced by a factor in the range $1 \times 10^3 - 1 \times 10^4$.

The internal support structure typically comprises feedback and/or feed forward-like control arrangements that result in a reduction of an influence of the aircraft acceleration by a factor of at least $10^3$.

In one specific embodiment the at least one movable sensing element comprises a pair of sensor masses that form an Orthogonal Quadruple Responder (OQR).

The at least one sensor element may be arranged for rotation about an axis and in a manner such that a centre of mass of the at least one sensing element is within 10 nm of the axis.

The invention will be more fully understood from the following description of specific embodiments of the invention. The description is provided with reference to the accompanying drawings.

BRIEF DESCRIPTION OF THE DRAWINGS

FIG. 23 is a frequency tuning circuit according to an embodiment of the present invention;

FIGS. 24 to 26 show circuitry according to embodiments of the present invention;

DETAILED DESCRIPTION OF THE SPECIFIC EMBODIMENTS

Figure 1:
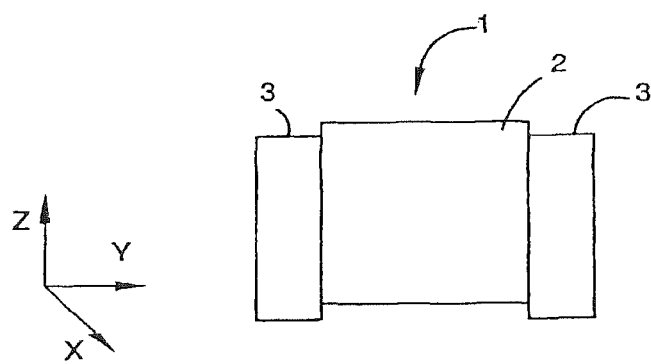
FIG. 1 is a schematic view of a gravity gradiometer according to a specific embodiment of the present invention.

FIG. 1 is a schematic view of a gravity gradiometer 1 according to a specific embodiment of the present invention. The gravity gradiometer 1 is arranged for vertical positioning relative to a ground plane.

Throughout this specification the ground plane coincides with an x-y plane of an x,y,z-coordination system and the gravity gradiometer is in this embodiment arranged for rotation about the z-axis and oriented in a manner such that the $\Gamma_{xy}$ and $(\Gamma_{xx}-\Gamma_{yy})$ components of the gravity gradient tensor can be measured.

The function of the gravity gradiometer 1 may be briefly summarised as follows. The gravity gradiometer has in this embodiment two substantially identical sensor masses which are pivotally mounted on a mounting so that they can oscillate relative to the mounting. The sensor masses with mounting are rotated about the z-axis and with an angular frequency that approximately equals half the resonance frequency of sensor masses. A gravity gradient will result in a force on the sensor masses which will then oscillate relative to the mounting during that rotation. Components of the gravity gradient tensor can be determined from the oscillating movement of the sensor masses relative to each other. For further details on the general principal of such measurements are described in the applicants co-pending PCT international patent application number PCT/AU2006/001269.

The gravity gradiometer shown in FIG. 1 comprises a housing 2 which is connected to an external support structure 3 ("external platform"). The external platform 3 is arranged for rotation of the housing 2 at a suitable angular frequency about the z-axis. Further, the external platform 3 is arranged for adjusting an orientation of the housing 2 about three orthogonal axes. An internal support structure ("internal platform") comprises the sensor masses and is positioned within the housing 2. The internal platform is arranged for fine adjustment of the rotation about the z-axis in a manner such that transmission of an external angular acceleration about the z-axis to the sensor masses is further reduced. The resultant z-axis rotation, as experienced by the sensor masses, is of high precision and any remaining angular accelerations about or along the x- and y-axes are reduced electronically by processing a signal indicative of the gravity gradiometer generated by the gravity gradiometer 1.

The gravity gradiometer 1 is arranged for positioning in an aircraft in a manner such that an influence of an aircraft angular acceleration on a signal indicative of the gravity gradient is reduced by a factor of at least $10^7$, typically $10^8$ or even $2 \times 10^8$. The external platform 3 comprises gimbals, sensors and actuator and is arranged so that an x, y and z-axis angular acceleration component of the aircraft angular acceleration is reduced by a factor of at least $0.5 \times 10$, 10 or more. The internal platform also comprises a gimbal, an acceleration sensor and an actuator and is arranged so that at least a z-axis component of the aircraft angular acceleration is reduced. A combination of feed-back and feed forward like control arrangements, which will be described further below, result in a reduction of an impact of the aircraft angular acceleration by a factor of the order of $10^3$-$10^4$. Further, the sensor masses are mechanically and electronically arranged so that a component of the aircraft angular acceleration is reduced by a factor of at least $10^3$, typically $10^4$.

The sensor masses are arranged (balanced) so that a linear component of the aircraft acceleration is reduced by a factor of at least $10^6$, typically $10^7$ and a support structure of the gravity gradiometer is arranged so that a linear component of the aircraft acceleration is reduced by a factor of at least $10^2$, typically $10^3$.

The following will describe components and function of the gravity gradiometer 1 in detail.

Figure 2:
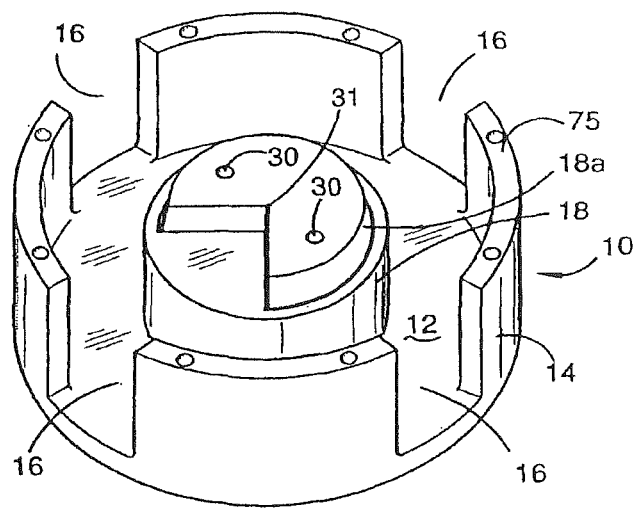
FIG. 2 is a perspective view of a first mount forming part of a mounting of the gravity gradiometer of according to the specific embodiment of the present invention.
Figure 5:
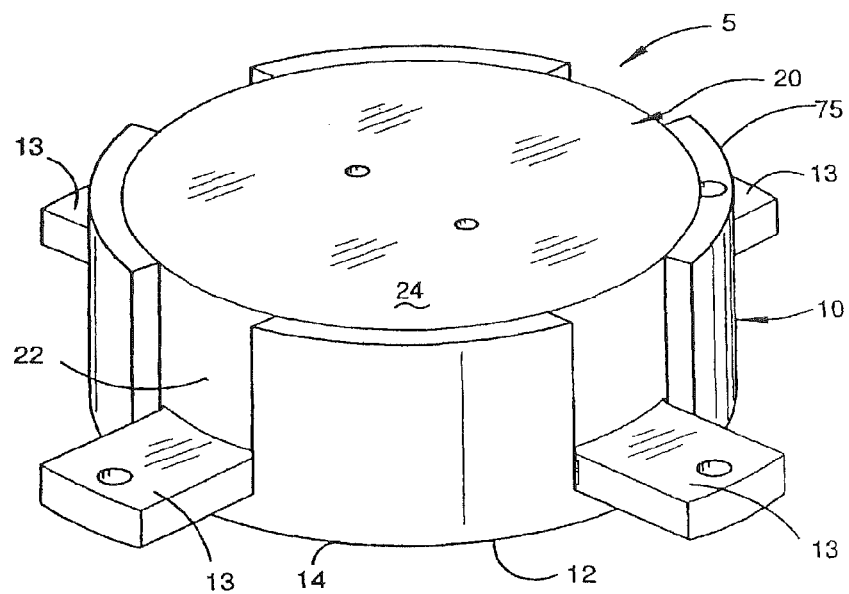
FIG. 5 is a view of the assembled structure.

With reference to FIG. 2, a first mount 10 is now described. The first mount 10 forms a part of rotatable mounting 5 which is shown in FIG. 5. The mount 10 comprises a base 12 and an upstanding peripheral wall 14. The peripheral wall 14 has a plurality of cut-outs 16. The base 12 supports a hub 18.

Figure 3:
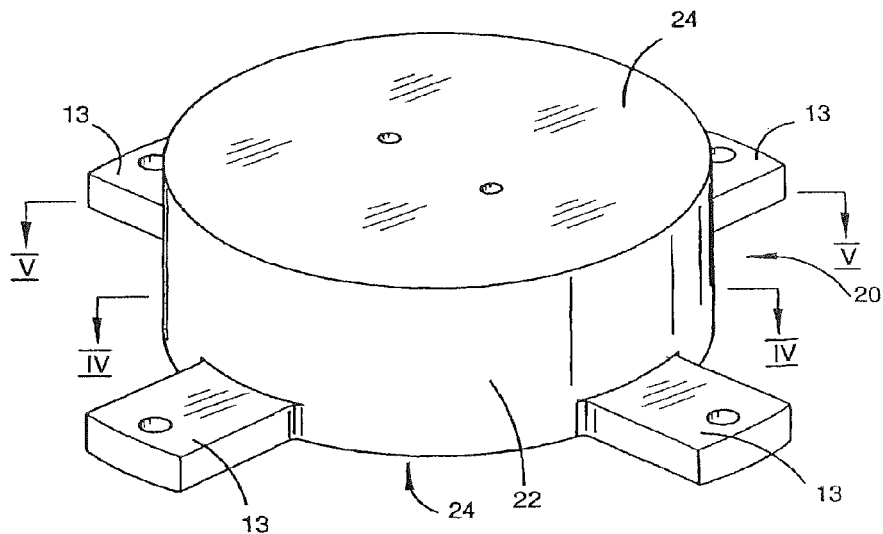
FIG. 3 is a perspective view of a second mount of the mounting according to a specific embodiment of the present invention.
Figure 4:
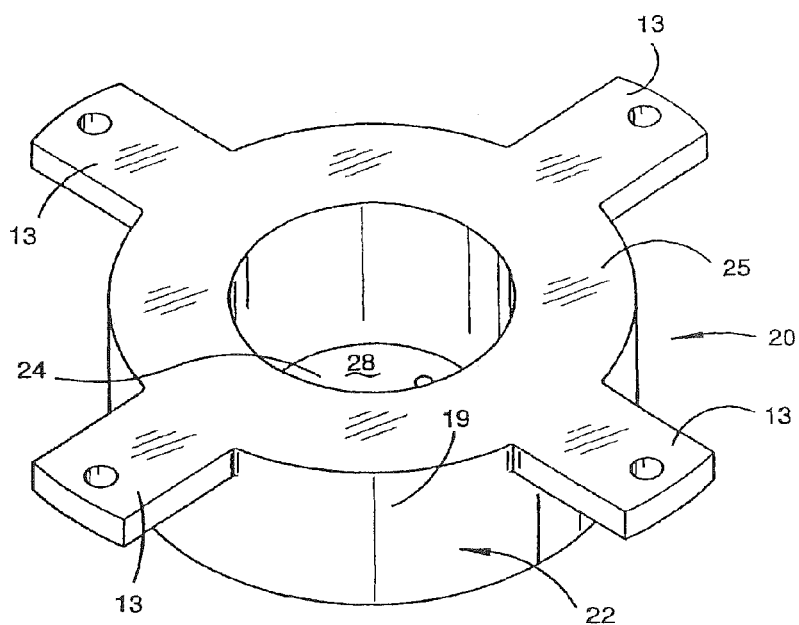
FIG. 4 is a perspective view from underneath the mount shown in FIG. 3.

FIGS. 3 and 4 show a second mount 20 which comprises a peripheral wall 22 and a top wall 24. The peripheral wall 22 has four lugs 13 for supporting the mounting 5 in the housing 2. The top wall 24 and the peripheral wall 22 define an opening 28. The second mount 20 is mounted on the first mount 10 by locating the hub 18 into the opening 28 and the lugs 13 through respective cut-outs 16 as is shown in FIG. 5.

The first mount 10 is joined to the second mount 20. The flexure web 31 is formed in the first mount 10 so that a primary mount portion of the mount 10 can pivot about a flexure web 31 relative to a secondary mount portion of the mount 10. This will be described in more detail with reference to the second embodiment shown in FIGS. 10 to 16.

The mounting 5 mounts the sensor 40 (which will be described in more detail hereinafter and which is typically in the form of a mass quadruple) for fine rotational adjustment about the z-axis for stabilising the gradiometer during the taking of measurements particularly when the gradiometer is airborne. As described above, rotational stabilisation about the x- and y-axis is in this embodiment provided by the external platform only. The gravity gradiometer 1 is arranged so that in use the mounting 5 is oriented parallel to the x-y plane.

Figure 6:
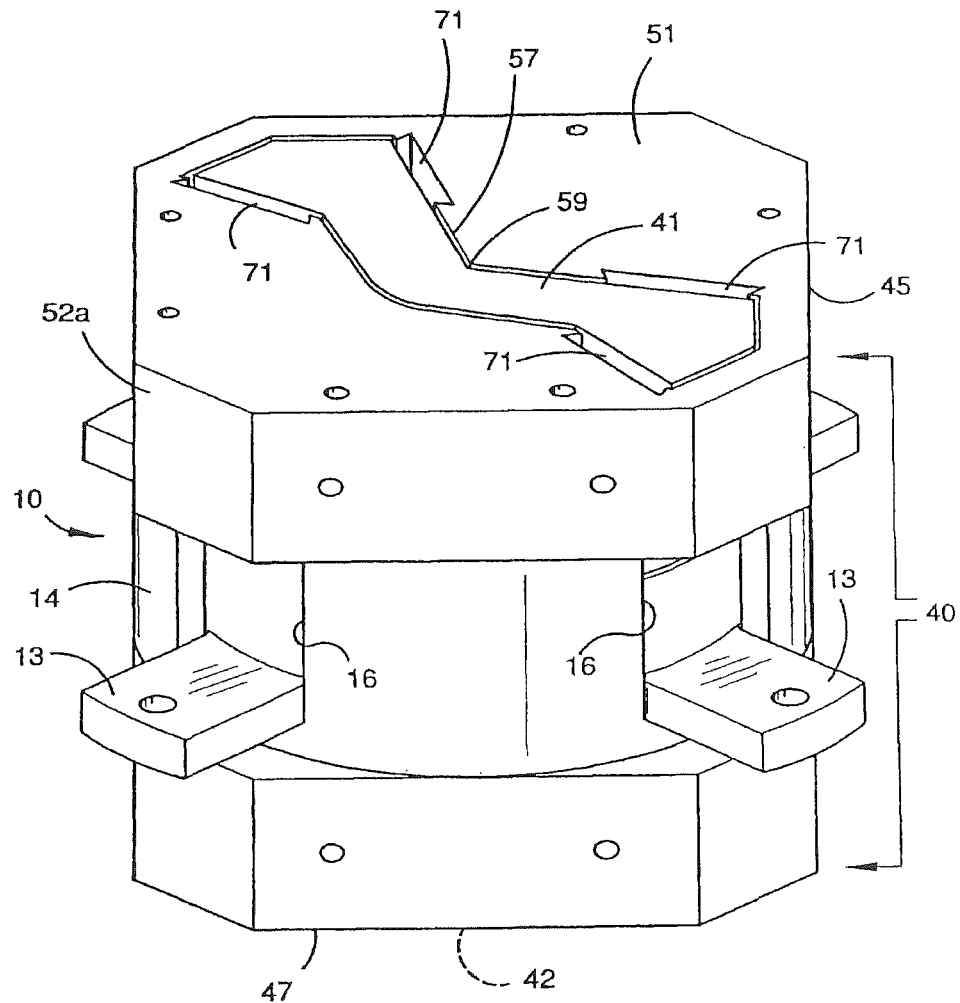
FIG. 6 is a perspective view showing assembled components of the gravity gradiometer according to another specific embodiment of the present invention.

FIG. 6 shows sensor 40 mounted on the mounting. The sensor 40 is an Orthogonal Quadruple Responder—OQR sensor formed of a first sensor mass and a second sensor mass in the form of a first sensor mass 41 and a second sensor mass 42 (not shown in FIG. 6) orthogonal to the sensor mass 41 and which is of the same shape as the sensor mass 41.

The sensor mass 41 is positioned in a first housing portion 45 and the sensor mass 42 is positioned in a second housing portion 47. The sensor mass 41 and the second housing portion 45 is the same as the sensor 42 and the second housing portion 47 except that one is rotated 90° with respect to the other so that the sensor masses 41 and 42 are orthogonal. Hence only the first housing portion 45 will be described.

Figure 7:
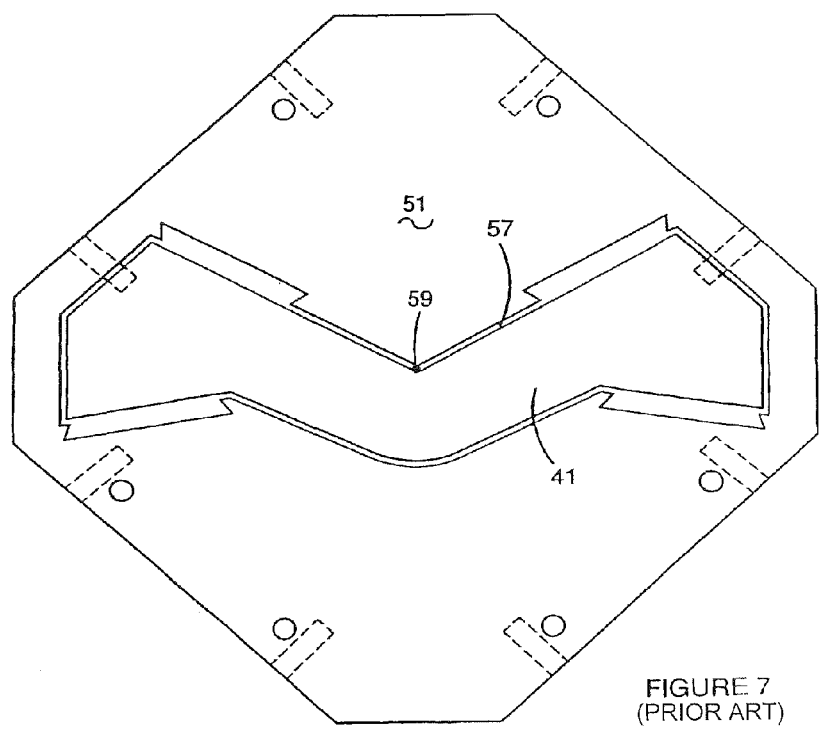
FIG. 7 is a plan view of a sensor mass according to a specific embodiment of the present invention.

The first housing portion 45 has an end wall 51 and a peripheral side wall 52a. The end wall 51 is connected to rim 75 (FIGS. 2 and 5) of the wall 14 of the first mount 10 by screws or the like (not shown). The sensor mass 41 is formed by a cut 57 in the wall 51 except for a second flexure web 59 which joins the sensor mass 41 to the wall 51. The second flexure 59 web is shown enlarged in the top view of the sensor mass 41 in FIG. 7. Thus, the sensor mass 41 is able to pivot in the x-y plane relative to the first housing portion 45 in response to changes in the gravitational field. The sensor mass 42 is mounted in the same way as mentioned above and also can pivot in the x-y plane relative to the second housing portion 47 in response to changes in the gravitational field about a third flexure web. The second housing portion 47 is connected to base 12 (FIG. 2) of the first mount 10.

The sensor mass 41 and the first housing portion 45 together with the second flexure web 59 are an integral monolithic structure.

Transducers 71 (not shown in FIGS. 2 to 4) are provided for measuring the movement of the sensor masses 41 and 42 and for producing output signals indicative of the relative movement in the x-y pane and therefore of the gravity gradient.

Figure 8:
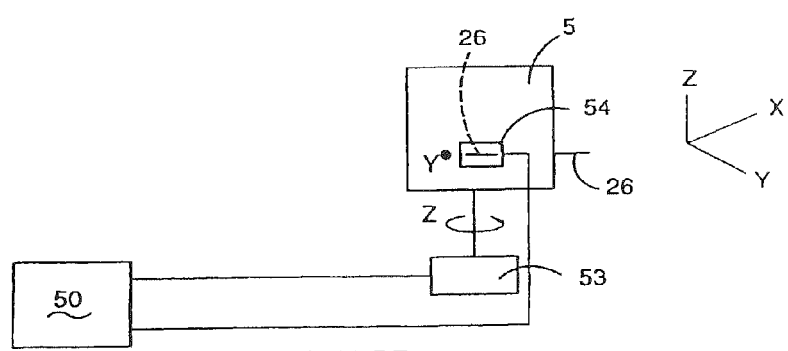
FIG. 8 is a diagram showing actuator control according to a specific embodiment of the present invention.

FIG. 8 is a schematic block diagram showing actuator control to stabilise the gradiometer by rotating the mounting 5 about the z-axis. A controller 50 which may be a computer, microprocessor or the like outputs signals to actuators 53 and 54, which are arranged to rotate the mounting 5 about the z-axis. Each actuator is positioned stationary relative to lugs 13 and coupled to the first mount 10 so that the actuator can effect a rotation by a small angle of the mount 10 with other components relative to the lugs 13 (and other components that are stationary relative to the lugs 13). Each actuator provides a linear movement and is positioned so that the linear movement is translated into a small rotation of the mount 10. The actuators will be described in more detail with reference to FIG. 27. The position of the mounting 5 is monitored so that appropriate feedback can be provided to the controller 50 and the appropriate control signals provided to the actuators to rotate the support 10 about the z-axis as is required to stabilise the support during movement through the air either within or towed behind an aircraft.

The specific embodiment also includes angular accelerometers which are similar in shape to the sensor masses 41 and 42 but the shape is adjusted for zero quadruple moment. The linear accelerometers are simple pendulous devices with a single micro pivot acting as the flexural hinge.

Figure 9:
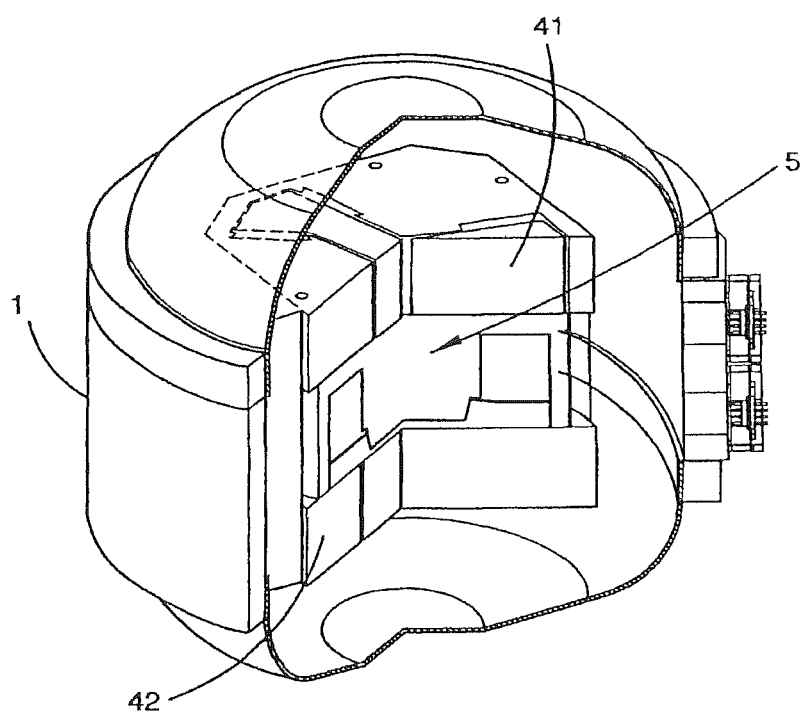
FIG. 9 is a perspective view of components of a gravity gradiometer according to a specific embodiment of the present invention.

FIG. 9 is a cut away view of components of the gravity gradiometer ready for mounting in the housing 1 which in turn is to be mounted in the external platform 2.

The transducers 71 measure the angle of displacement of the sensor masses 41 and 42 and control circuitry (not shown) is configured to measure the difference between them.

In this embodiment, the transducers 71 are constant charge capacitors, which will be described in more detail with reference to FIG. 22.

FIGS. 10 to 15 show a second embodiment in which like parts indicate like components to those previously described.

Figure 15:
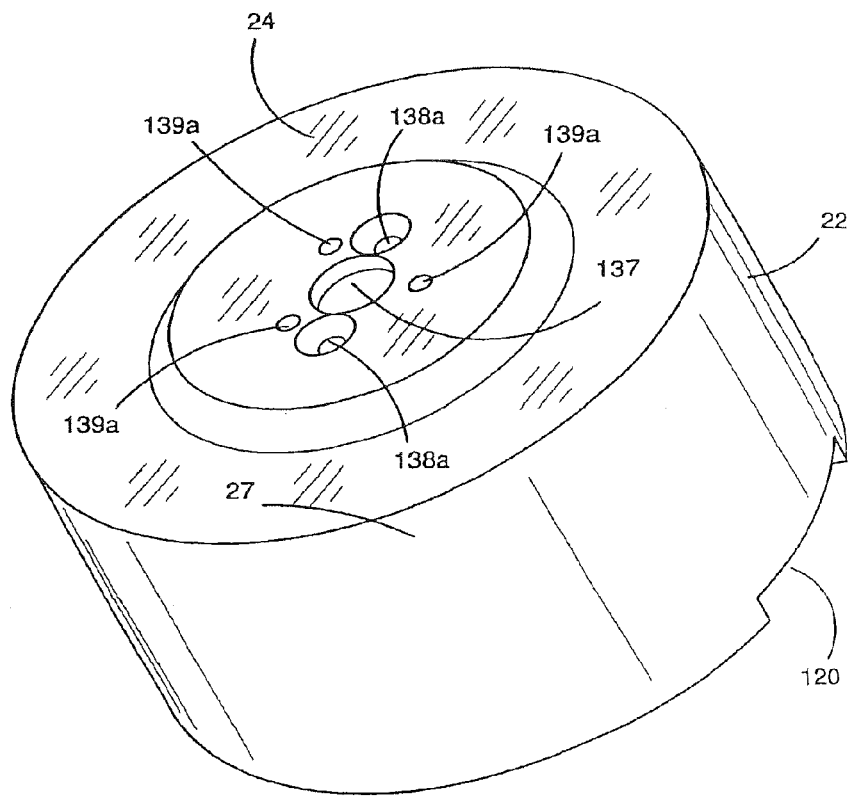
FIG. 15 is a perspective view of the second mount component of FIG. 14 from above.
Figure 16:
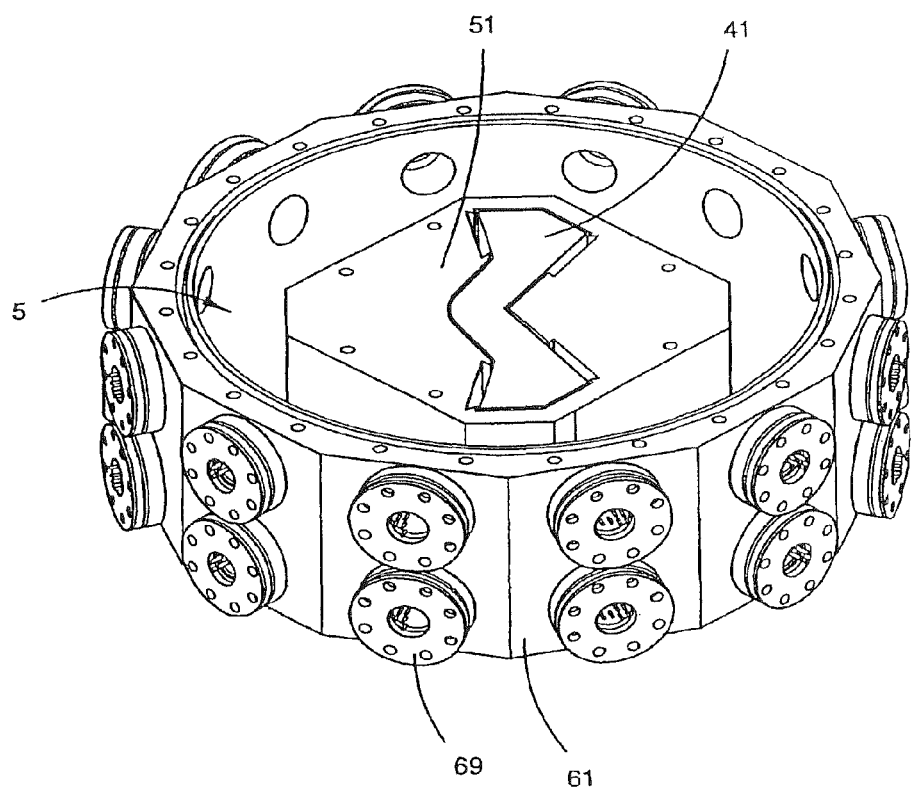
FIG. 16 is a perspective view of assembled components of the gravity gradiometer according to a specific embodiment of the present invention.

In the second embodiment the first mount 10 has cut-outs 80 which effectively form slots for receiving lugs (not shown) which are connected to the mount 10 in the cut-outs 80 and also to the second mount 20 shown in FIGS. 15 and 16. In this embodiment the lugs are separate components so that they can be made smaller, and more easily, made than being cut with the second mount section 20.

Figure 10:
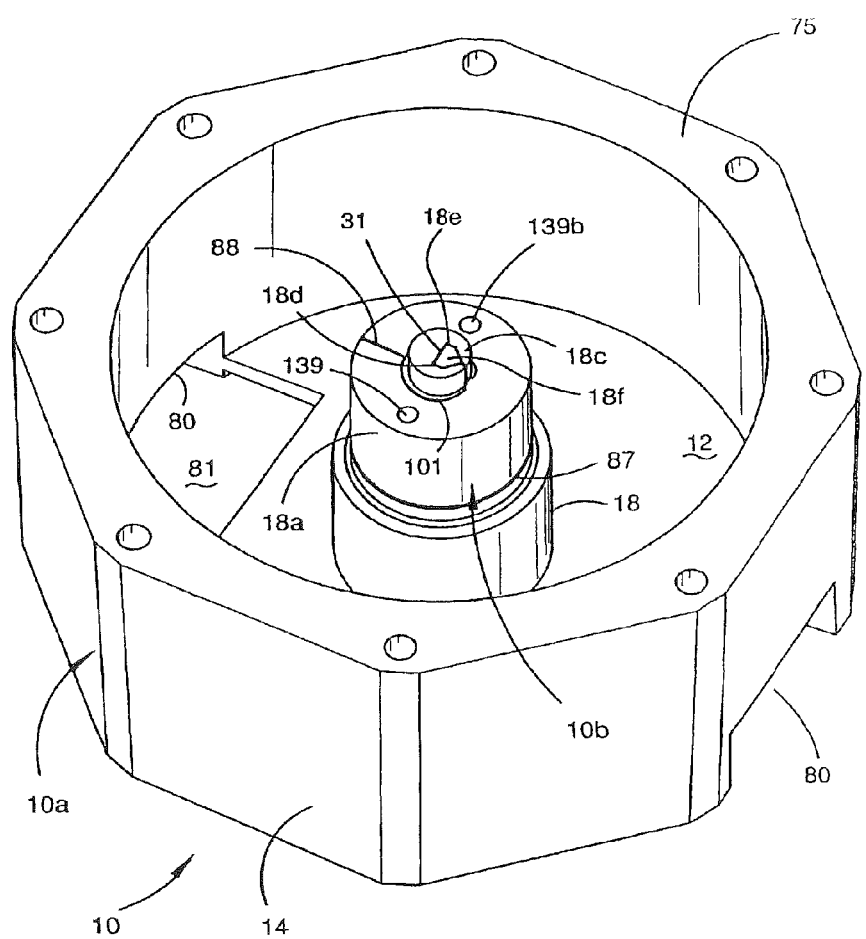
FIG. 10 is a perspective view of a first mount of a mounting according to another specific embodiment of the present invention.

In FIG. 10 a cut 87 is made to define the part 18*a* of the hub 18. The cut 87 then extends radially inwardly at 88 and then around central section 18*c* as shown by cut 101. The cut 101 then enters into the central section 18*c* along cut lines 18*d* and 18*e* to define a core 18*f*. The core 18*f* is connected to the central section 18*c* by the flexural web 31 which is an uncut part between the cut lines 18*e* and 18*d*. The part 10*a* therefore forms a primary mount portion of the mount 10 which is separated from a secondary mount portion 10*a* of the mount 10 except for where the portion 18*a* joins the portion 10*a* by the flexural web 31. The part 18*a* effectively forms an axle to allow for rotation of the part 18*a* relative to the part 10*a* in the z direction about the flexure web 31.

Figure 11:
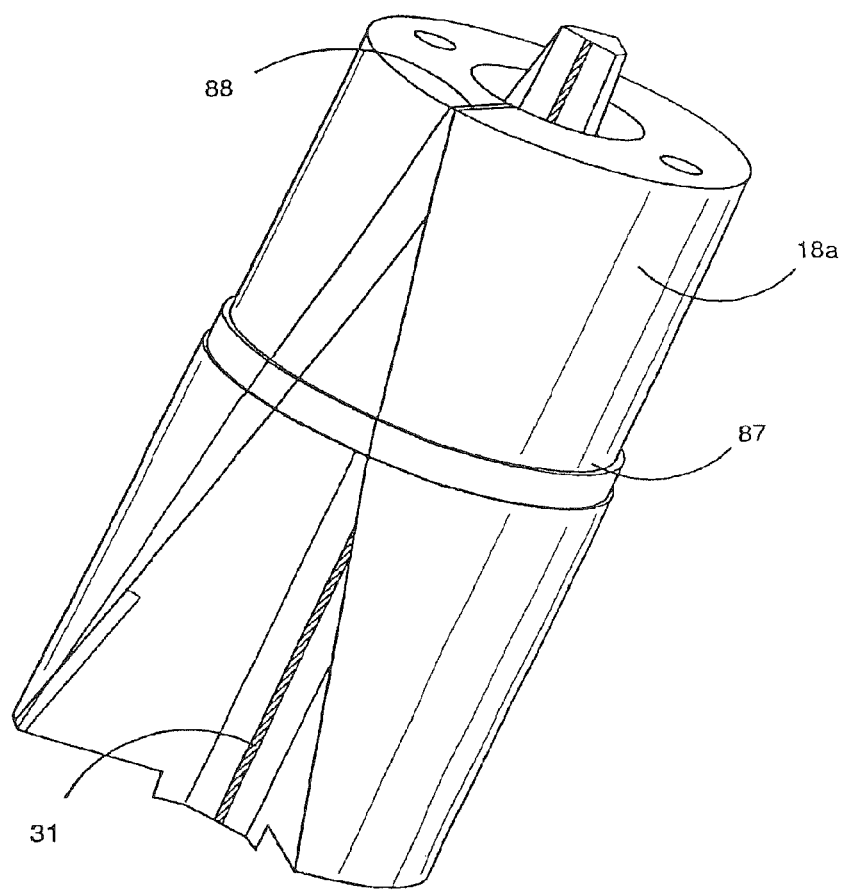
FIG. 11 is a perspective view of part of the mounting of FIG. 10 to illustrate the location and extent of the flexural web of the first mount.

As is shown in FIG. 11, the cut line 88 tapers outwardly from the upper end shown in FIG. 11 to the lower end and the core 18*c* tapers outwardly in corresponding shape.

Figure 12:
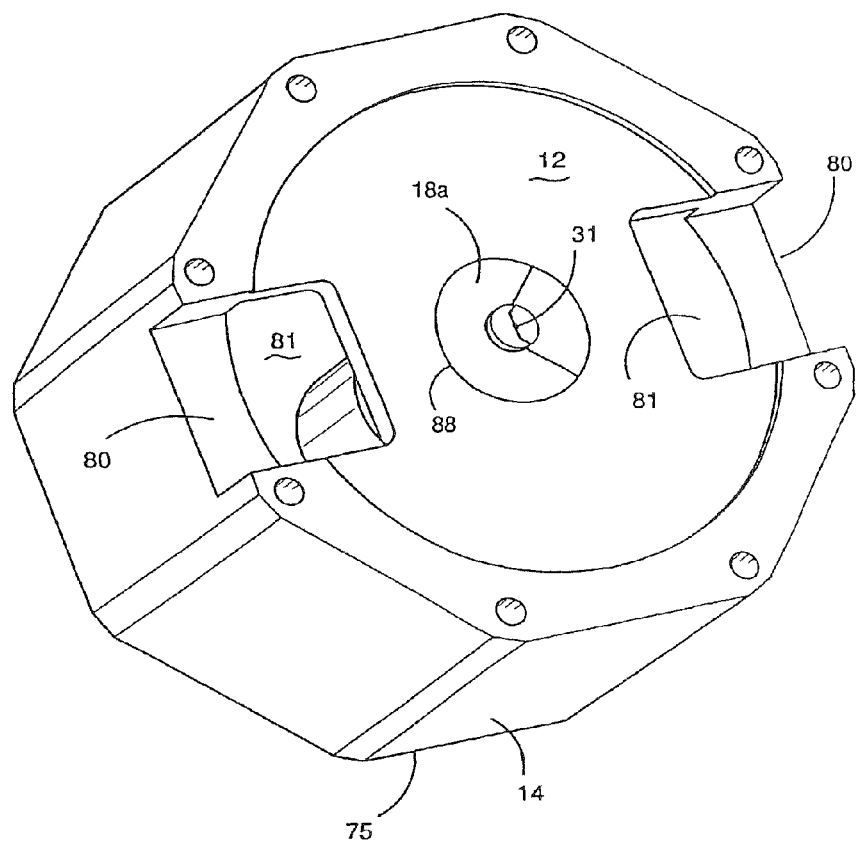
FIG. 12 is a perspective view of the mounting of FIG. 10 from beneath.
Figure 13:
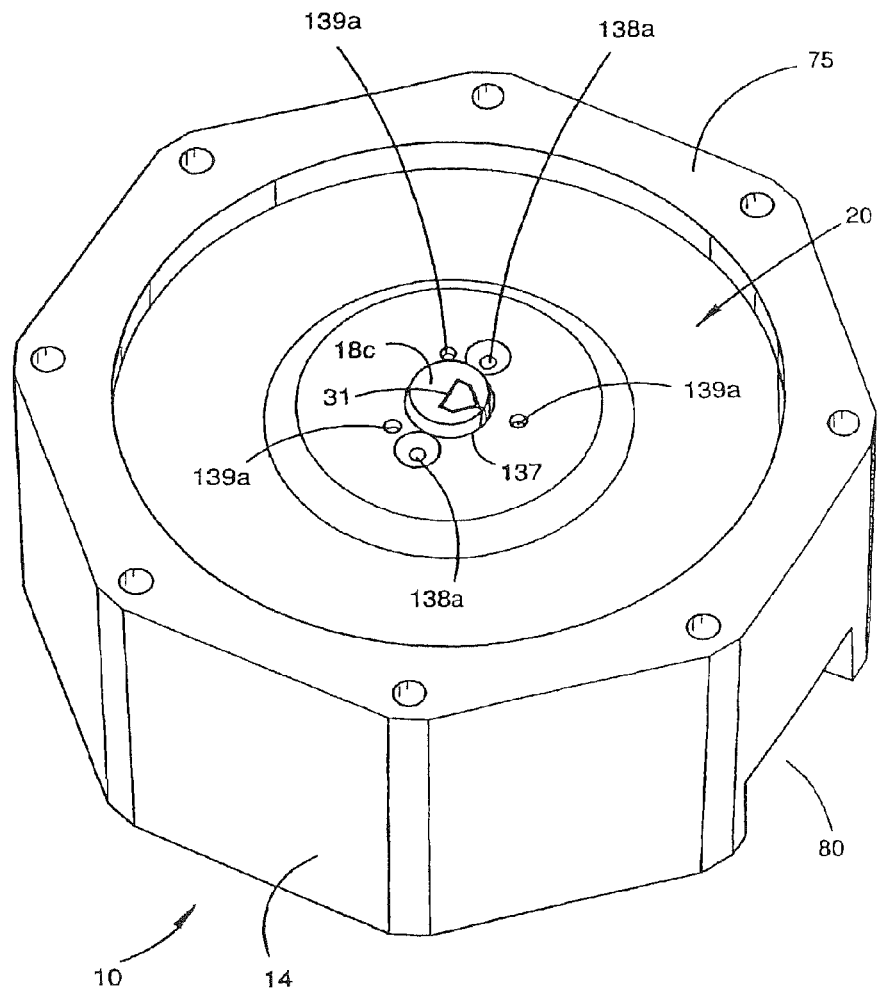
FIG. 13 is a perspective view of the mounting of FIG. 10 including a second mount of the second embodiment.

As is apparent from FIGS. 10, 12 and 13, the first mount 10 is octagonal in shape rather than round, as in the previous embodiment.

Figure 14:
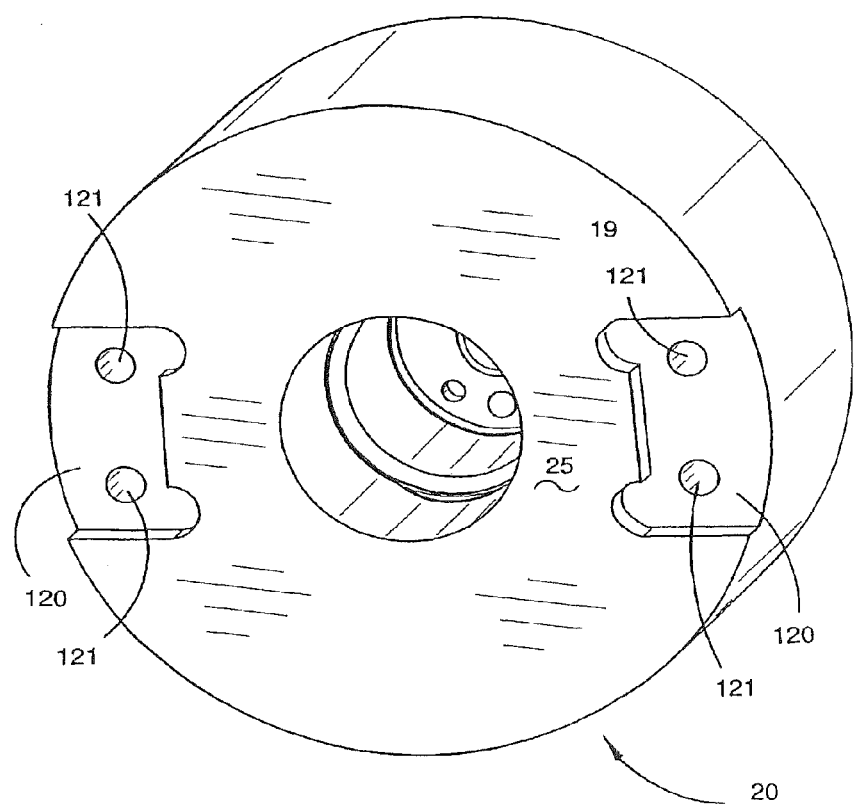
FIG. 14 is a perspective view of a second mount component.

FIG. 14 shows a component of the second mount 20 for mounting in the first mount 10. As is best shown in FIGS. 14 and 15, the second mount 20 has cut-outs 120 which register with the cut-outs 80 for receiving lugs (not shown). The lugs can bolt to the second mount 20 by bolts which pass through the lugs and into bolt holes 121. The lugs (not shown) are mounted to the mount 20 before the mount 20 is secured to the first mount 10.

In this embodiment, top wall 24 is provided with a central hole 137 and two attachment holes 138*a*. Three smaller holes 139*a* are provided to facilitate pushing of the first housing portion 45 off the part 18*a* if disassembly is required. When the second mount 20 is located within the first mount 10, the upper part of central section 18*c* projects through the hole 137, as best shown in FIG. 13. The mount 20 can then be connected to the mount 10 by fasteners which pass through the holes 138 and engage in holes 139*b* (see FIG. 10) in the part 18*a*.

Thus, when the first housing portion 45 and its associated sensor mass 41 is connected to the rim 75 of the first mount 10 and the second housing portion 47 is connected to the base 12, flexure web 31 allows movement of the housing portions 45 and 47 about the z-axis.

Consequently, when the second mount 20 is fixed to the part 18*a*, the second mount 20 can pivot with the first portion 10*a* of the first mount 10 about a z-axis defined by the flexure web 31 whilst the second portion formed by the part 18*a* remains stationary.

FIG. 16 shows main body 61 of the housing 1 and connectors 69 with the hemispherical ends removed.

Figure 17:
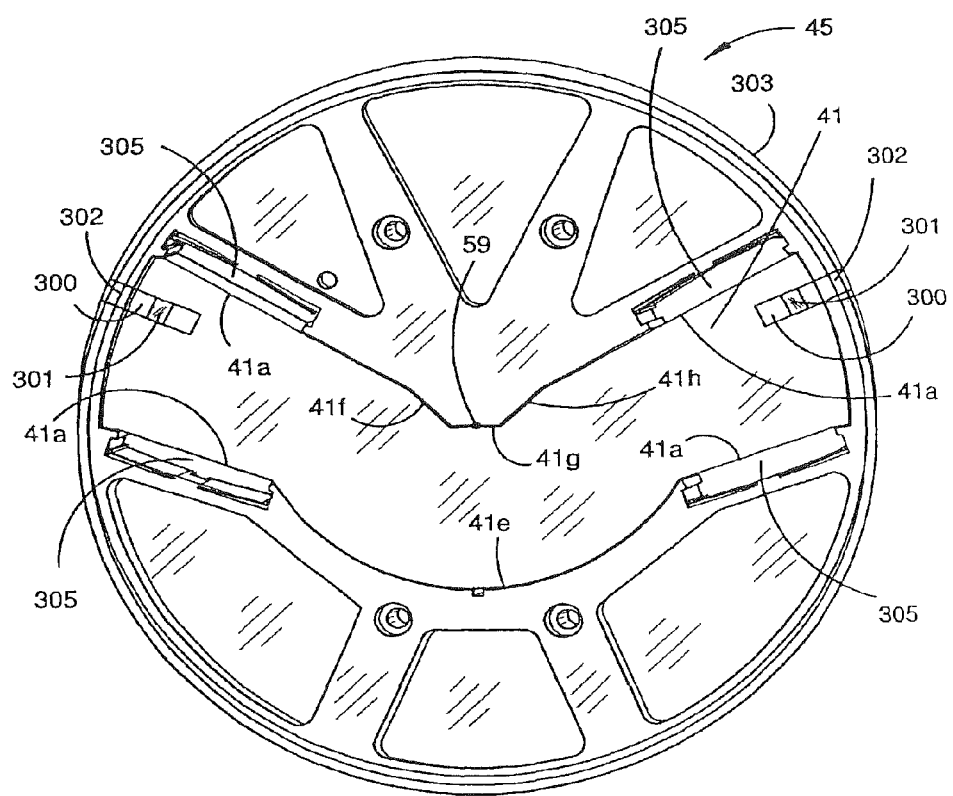
FIG. 17 is a plan view of a housing portion for supporting a sensor mass according to a further embodiment of the invention.

FIG. 17 is a plan view of the first housing portion 45 according to a still further embodiment of the invention. As is apparent from FIG. 17, the first housing portion 45 is circular rather than octagonal, as is the case with the embodiment of FIG. 6.

The first housing portion 45 supports sensor mass 41 in the same manner as described via flexure web 59 which is located at the centre of mass of the sensor mass 41. The sensor mass 41 is of chevron shape, although the chevron shape is slightly different to that in the earlier embodiments and has a more rounded edge 41 opposite flexure web 59 and a trough-shaped wall section 41*f*, 41*g* and 41*h* adjacent the flexure web 59. The ends of the sensor mass 41 have screw-threaded bores 300 which receive screw-threaded members 301 which may be in the form of plugs such as grub screws or the like. The bores 300 register with holes 302 in the peripheral wall 52*a* of the first housing portion 45. The holes 302 enable access to the plugs 301 by a screwdriver or other tool so that the plugs 301 can be screwed into and out of the bore 300 to adjust their position in the bore to balance the sensor ass 41 so the centre of gravity is at the flexure web 59.

As drawn in FIG. 17, the bores 300 are a 45° angle to the horizontal and vertical. Thus, the two bores (302 shown in FIG. 17) are at right angles with respect to one another.

The sensor masses 41 and 42 are balanced about the respective flexure webs so that the respective centres of mass are displaced by less than 10 or even 5 nm from the axis about which the masses in use pivot. This balance is achieved mechanically using grub screws and an effect of a remaining imbalance is reduced electronically using a feed forward-like arrangement that controls forces on the sensor masses 41 and 42.

FIG. 17 also shows openings 305 for receiving a portion of the transducers 71 for monitoring the movement of the sensor mass 41 and producing signals in response to the movement. Typically, each transducer 71 is in the form of a constant charge capacitor. One capacitor plate typically is mounted to the sensor mass 41 and another capacitor plate is stationary relative to the sensor mass 41 so that a gap is defined between the capacitor plates. Movement of the sensor mass changes the gap which in turn changes a voltage across the constant charge capacitor.

Figure 18:
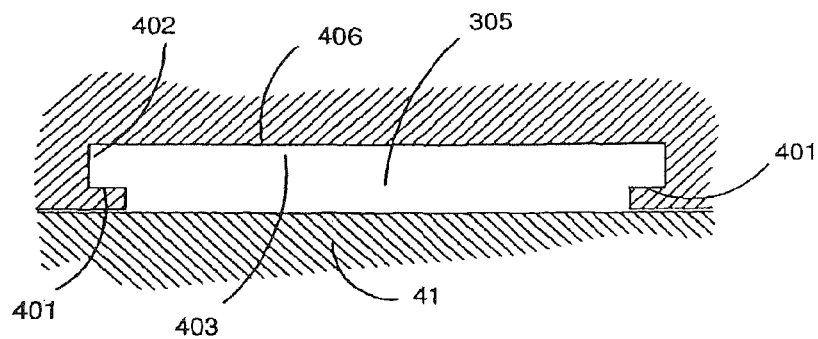
FIG. 18 shows a component of the gravity gradiometer according to an embodiment of the present invention.

FIG. 18 is a more detailed view of part of the housing portion of FIG. 17 showing the openings 305. As can be seen from FIG. 18, the openings 305 have shoulders 401 which form grooves 402.

Figure 19:
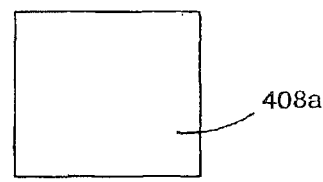
FIG. 19 (a)-(f) is a view of transducer elements according to a specific embodiment of the present invention.
Figure 19:
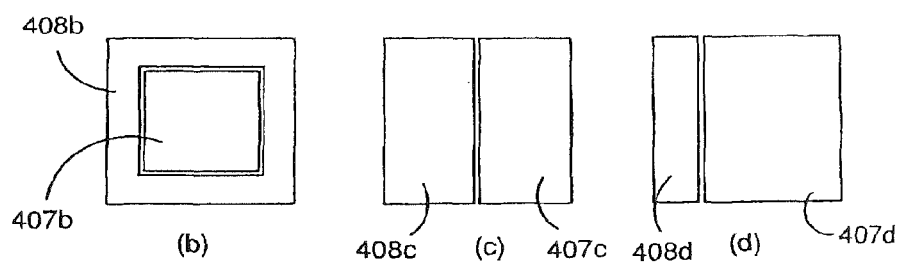
Figure 19:
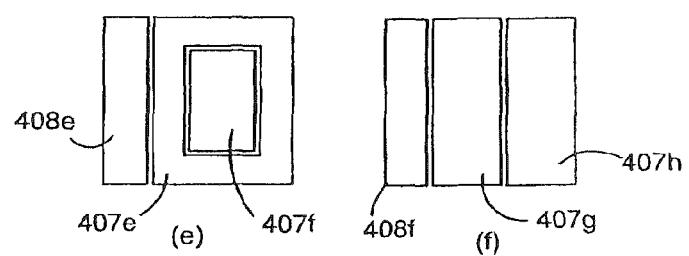

FIG. 19 (*a*) to (*f*) show portions of the constant charge capacitor transducers 71. The transducer shown in FIG. 19 (*a*) comprises two electrodes. A first electrode is in this embodiment provided by a surface of the sensor masses 41 or 42, which are at ground potential, and a second electrode is shown in FIG. 19 (*a*) (plate 408 *a*).

FIG. 19 (*b*) shows the second capacitor electrode which comprises two separate capacitor elements 408*b* and 407*b* which are not in electrical contact. Again, the first electrode is provided by the sensor masses 41 or 42, which are at ground potential. The capacitor element 408*b* surrounds the capacitor element 407*b*. This arrangement is used for generating a "virtual capacitor", which will be described below with reference to FIG. 22.

FIGS. 19 (*c*) and (*d*) show alternatives to the embodiment shown in FIG. 19 (*b*) and the shown second electrodes comprise adjacent elements 408*c*, 407*c* and 408*d* and 407*d* respectively.

FIGS. 19 (*e*) and (*f*) show capacitor elements according to further embodiments of the present invention. The second electrode comprises three capacitor elements 408*e*, 407*e*, 407*f* and 408*f*, 407*g* and 407*h*, respectively, and this arrangement is also used for generating a "virtual capacitor which will be described below.

It will be appreciated, that in variation of this embodiment the capacitor plates may have any other suitable cross-sectional shape.

Figure 20:
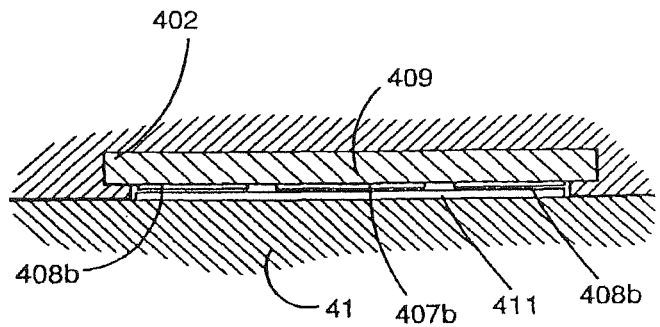
FIG. 20 is a view similar to FIG. 18 but showing one of the transducers elements of FIG. 19 in place.

As an example, FIG. 20 shows the location of the capacitor elements 407*b* and 408*b* in the opening 305 and opposite a corresponding second capacitor plate 411. In this embodiment the capacitor elements 407*b* and 408*b* are provided in the form of metallic foils that are positioned on insulating body 409. The plate 411 is metallic and positioned on the sensor mass 41. In this embodiment plate 411 provides one capacitor element that opposes capacitor elements 407 *b* and 408 *b*. In this case the sensor mass 41 may be of relatively low electrical conductivity or may be electrically insulating.

If the sensor mass 41 is provided in the form of a metallic material of sufficiently high electrical conductivity, the sensor mass 41 may also provide a capacitor element and a portion of the sensor mass 41 may directly oppose the capacitor elements 407*b* and 408*b* without the plate 411, as discussed above in the context of FIG. 17.

Figure 21:
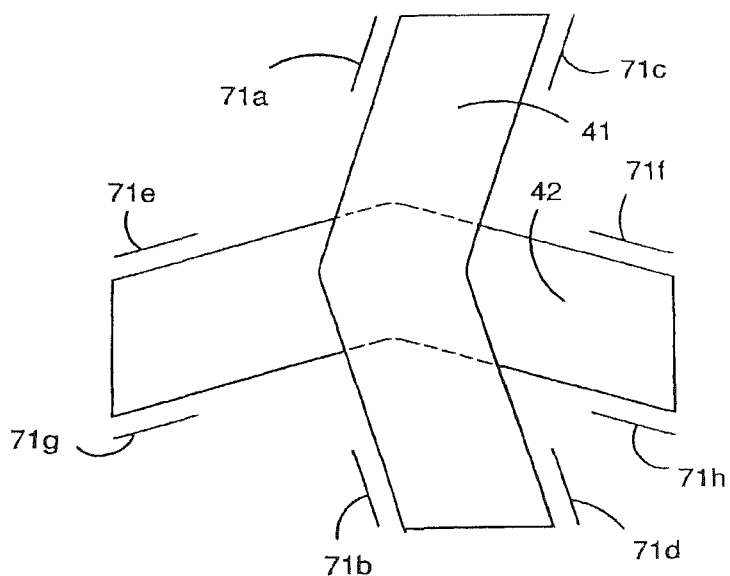
FIG. 21 is a diagram to assist explanation of the circuits of FIG. 22.

FIG. 21 is a diagram of the sensor masses 41 and 42 showing them in their "in use" configuration. The transducers which are located in the openings 305 are shown by reference numbers 71*a* to 71*e*.

As will be apparent from FIG. 21, four transducers 71 are arranged adjacent the ends of the sensor mass 41. The second housing portion 47 also has four transducers arranged adjacent the sensor mass 42. Thus, eight transducers 71 are provided in the gradiometer.

Figure 22:
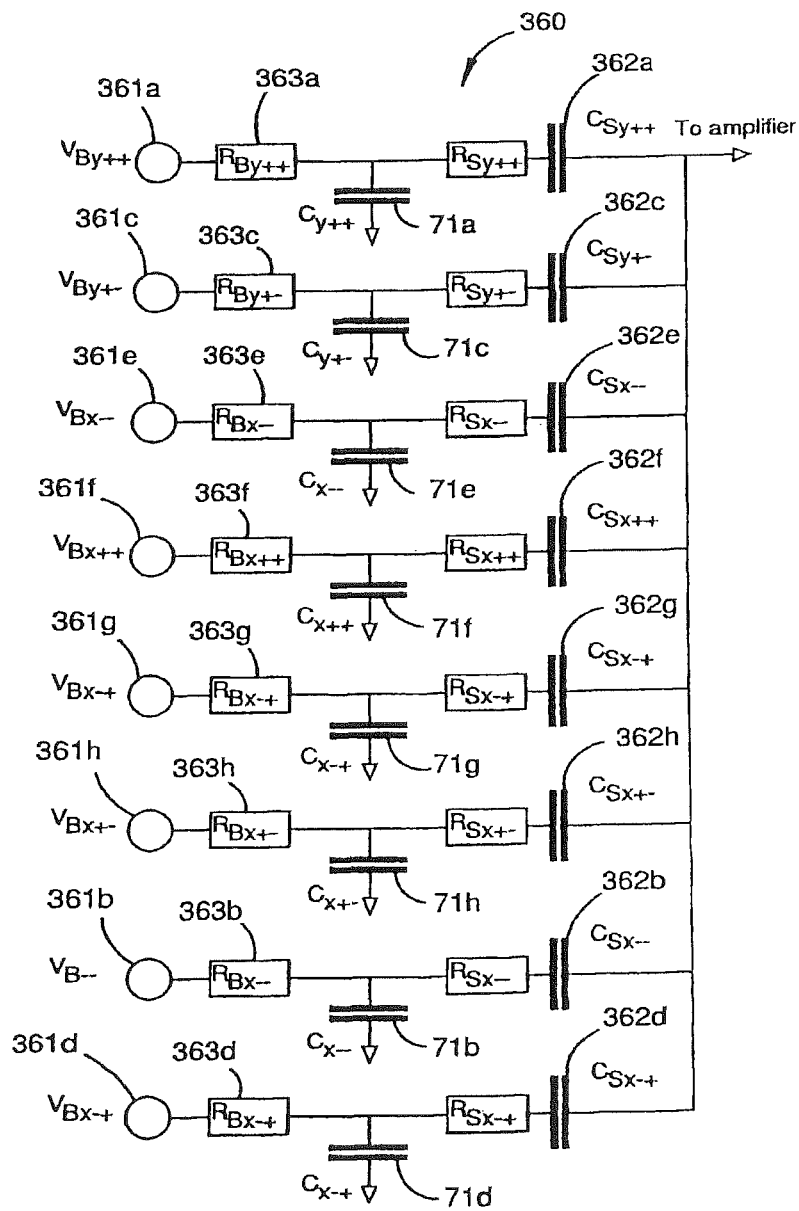
FIGS. 22 (a)-(d) are circuit diagram relating to a specific embodiment of the invention.
Figure 22:
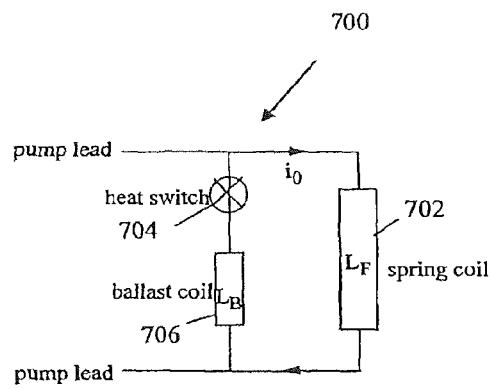
Figure 22:
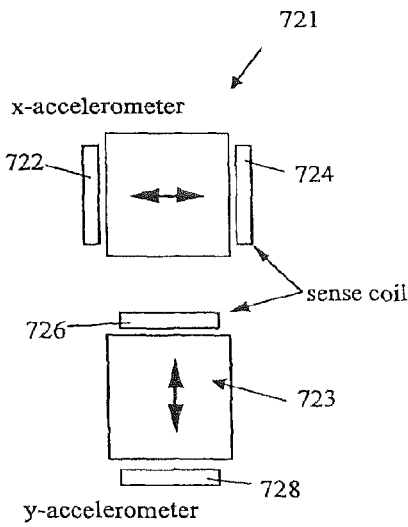
Figure 22:
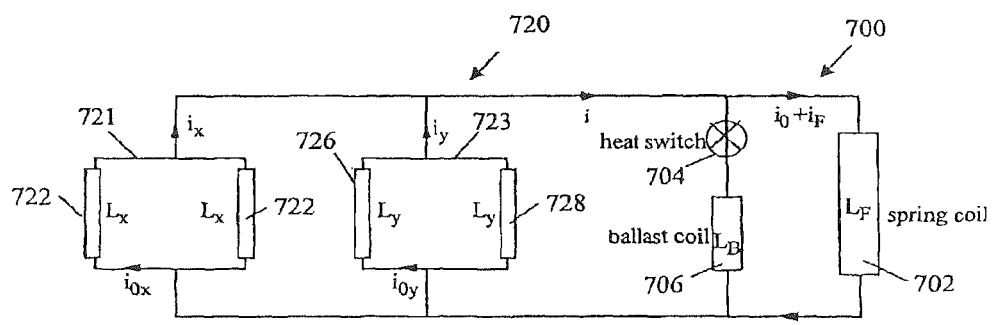

Referring now to FIGS. 22 and 23 transducer circuitry 360 is now described. Each of the transducers 71*a* to 71*e* is a constant charge capacitor and comprises a first capacitor electrode. Each of the transducers 71*a* to 71*e* has a second capacitor electrode that is positioned opposite a respective first capacitor electrode and fixed in position relative to the housing portions. The first capacitor electrode is in this embodiment provided by a surface the sensor masses 41 or 42. For example, each transducer 71*a*-71*e* may have a second electrode of the type as shown in FIG. 19.

Oscillating movement of the sensor masses 41 and 42 results in a movement of the first capacitor electrodes (surfaces of the sensor masses 41 or 42) relative to the second capacitor electrodes. That movement changes the gaps between respective first and second capacitor electrodes and results in a voltage change across the constant charge capacitor transducers 71*a* to 71*e*.

If the transducers are of the type as shown in FIGS. 19 (*b*) to 20 (*d*), then separate component transducers are formed between the first electrode and each capacitor element of the second electrode, such as 407*b* and 408*b*. In this case FIG. 22 shows the transducer circuitry for the component transducers formed between the first plate and one of the two elements and an analogous circuitry (labeled accordingly) is used for the component transducers formed between the first electrode and the other capacitor elements.

If the transducers are of the type as shown in FIGS. 19 (*e*) and 19 (*f*), then separate component transducers are formed between the first electrode and each of the three capacitor elements, such as 408*e*, 408*e* and 407*f*. FIG. 22 shows the transducer circuitry for the component transducers formed between the first electrode and one of the three elements and two analogous circuitries (labeled accordingly) are used for the component transducers formed between the first plate and the other capacitor elements.

Each constant charge capacitor component transducer 71*a* to 71*e* has a separate bias voltage by a respective bias voltage source $V_{B\alpha\beta\gamma}$ applied to it. FIG. 22 shows component transducer 71*a* to 71*e* with one of the capacitor elements being connected to ground potential. As discussed above, these capacitor elements are surfaces of the sensor masses 41 and 42, which are in this embodiment electrically conductive and connected to ground potential.

The polarities of the voltages provided by the bias voltage sources 361*a* to 361*e* and the electrical interconnections between the constant charge capacitor component transducers 71*a* to 71*e* are chosen so that the electrical signals generated by all transducers are combined with the same polarity if the sensor masses 41 and 42 oscillate in opposite directions. Such oscillation in opposite directions typically is generated by a gravity gradient if the sensor masses are balanced and have identical mechanical properties. If the sensor masses 41 and 42 move in the same direction, one half of the electrical signals generated by the constant charge capacitors component transducers 71*a* to 71*e* has one polarity and the other half has an opposite polarity. Consequently, in this case, the electrical signals typically cancel each other. Such movement in the same direction may for example be generated by a sudden movement of the aircraft in which the gravity gradiometer is positioned and consequently the transducer circuitry 360 illustrated in FIG. 22 reduces the effect of such sudden movements and the effect of a number of other external forces or external angular accelerations that are not related to the gravity gradient.

The combined electrical signal is directed to a low noise amplifier which will be described in the context of FIG. 23.

The transducer circuitry 360 shown in FIG. 22 also comprises locking capacitors $C_{S\alpha\beta\gamma}$ which are arranged so that the applied bias voltages $V_{B\alpha\beta\gamma}$ cannot reach the lower noise amplifier. The locking capacitors 362*a* to 362*e* typically have a capacitance that is larger than 10 times, or even larger than 100 times that of the respective constant charge capacitor component transducers 71*a* to 71*e*.

Further, the transducer circuitry 360 comprises resistors $R_{B\alpha\beta\gamma}$ 363*a* to 363*e*. These resistors typically have a very high resistance, such as 1 GΩ or more, and are arranged for substantially preventing flow of charges and thereby providing for the component transducers 71*a* to 71*e* to operate as constant charge capacitors.

The bias voltages applied to the constant charge capacitors generate electrostatic forces. Consequently, each transducer 71*a* to 71*e* can also function as an actuator.

If the transducers 71 are of the type as shown in FIG. 19(*a*), then the circuitry 360 shown in FIG. 22 is sufficient. However in a specific embodiment of the present invention the transducers are of the type as shown in FIGS. 19 (*b*) to 19(*d*) and comprise two component transducers. In this case two circuitries 360 are used, one for the component transducers formed between the first electrodes and one of the capacitor elements, and the other for the component transducers formed between the first electrodes and the other capacitor elements. This is schematically indicated in FIG. 25. A first circuitry 360 is used for measurement purposes (differential mode, "DM") and a second circuitry 360 is used to provide feedback for external rotational motion correction (common mode, "CM"), which will be described below with reference to FIGS. 28 and 29.

Alternatively, the circuitries 360 may also be connected so that "virtual capacitors" are formed. This will be described below in more detail and is schematically indicated in FIG. 24.

In another specific embodiment of the present invention the transducers are of the type as shown in FIG. 19 (*e*) or 19 (*f*) and comprise three component transducers. In this case three circuitries 360 are used. This is schematically indicated in FIG. 26. In this embodiment two circuitries 360 are used for measurement purposes and arranged so that "virtual capacitors" are formed. A third circuitry 360 is used to provide feedback for external rotational motion correction.

The following will describe how relative mechanical properties of the sensor masses 41 and 42 can be tuned. The resonance frequencies of the sensor masses 41 and 42 depend on the square of the electrostatic forces and therefore the square of the applied bias voltage. For example, the resonance frequencies may be tuned using a mechanical test set up in which external forces are applied to the sensor masses 41 and 42. If the resonance frequencies are not identical, the bias voltages can be adjusted until the resonance frequencies are identical.

The sensitivities of the transducer capacitors for sensing the movement of the sensor masses is linearly dependent on the electrostatic forces and thereby linearly dependent on the applied bias voltages. Consequently, it is possible to tune both the resonance frequencies and the sensitivities of the transducers.

The sensor masses 41 and 42 and their respective flexure webs are mechanically arranged so that their moment of inertia are sufficiently similar, and the transducers 71 are adjusted so that their sensitivities are sufficiently similar, so that an impact of an external angular acceleration is reduced by a factor of $10^3$ to $10^4$. As a consequence the sensor masses 41 and 42 have nearly identical resonance frequencies to within 1 part in $10^3$, typically within 1 part in $10^4$. An impact of an external angular acceleration is further reduced using feed-back and feed-forward arrangements. The feed-back and feed-forward like arrangements, which will be described with reference to FIGS. 29 and 30, result in a reduction of an influence of an external angular acceleration by a factor of approximately $10^3$-$10^4$.

In addition, the external platform 3 comprises gimbals that reduce an influence of the external angular acceleration by a factor of approximately 5 to 100, typically by a factor of the order of 10.

Further, the sensor masses 41 and 42 are mechanically balanced so that a distance between a centre of mass and the axis of rotation is less than one part in $10^6$, typically 1 part in $10^7$ of a radius of gyration of the sensor mass, which requires a high level of mechanical precision. A small remaining imbalance (may be by a distance of the order of one or more $10^{-9}$ m) is taken into account using a feed-forward like arrangement, which will be described below.

A feed-forward loop is formed by components including the transducer sensors 71, an acceleration sensor (not shown, but similar to acceleration sensors 721 and 723 shown in FIG. 22(*c*)), such as an additional capacitance sensor, and control electronics. The acceleration sensor is positioned at a fixed position relative to a housing portion 45 or 47 and, when an external linear acceleration is sensed, provides a voltage to a controller (not shown). The controller then causes the transducer sensors 71 to generate a suitable adjustment force that is aimed to counteract a difference in torque that the sensor masses 41 and 42 would experience as a consequence of the external linear acceleration. For this purpose a mechanical response parameter is required that is a measure for a ratio of an external linear acceleration and a corresponding adjustment force required to counteract a torque resulting from the external linear acceleration. Consequently, the mechanical response parameter is dependent on the mass dipole moment of the sensor masses 41 and 42 and the spring constants of the respective flexure webs. The mechanical response parameter is determined experimentally by exposing the sensor masses 41 and 42 in their respective housings to a linear acceleration and then determining a force that is required to compensate for a difference in torque that the sensor masses 41 and 42 would otherwise experience as a consequence of the external linear acceleration. As the sensor masses 41 and 42 are arranged for movement in the x, y-plane such an imbalance only needs to be considered for acceleration within that plane.

In the embodiment described above the transducer sensors 71 are provided in the form of capacitors that also function as actuators. It is to be appreciated that in an alternative embodiment the gravity gradiometer 1 may also comprise suitable inductive coils that replace the capacitors 71 and have corresponding sensing and actuating functions. The gravity gradiometer in accordance with the alternative embodiment comprises electronic components that accommodate the function of the inductive coils as sensors and actuators. PCT international application number PCT/AU2006/001269 discloses a gravity gradiometer having inductive coils for sensing a relative motion of sensor masses. The gravity gradiometer disclosed in PCT/AU2006/001269 is cooled cooling using liquid helium and the inductive coils are superconducting devices. The following will describe how the gravity gradiometer disclosed in PCT/AU2006/001269 can be adapted to account for the above-described "mass dipole moment" imbalance.

The PCT international application no. PCT/AU2006/001269 discloses coil arrangements ("sense coils") that are used for sensing a motion of the sensor bars and coil arrangements ("spring coils") that are used for tuning mechanical properties of the sensor bars. Anyone of the spring coils may be replaced by a circuitry as shown in FIG. 22 (*b*).

The superconducting circuitry 700 comprises a spring coil 702 that has inductance LF and in use carries a static persistent current i0 which flows through a heat switch 704 and a ballast inductor 706. The heat switch 704 is used to initially establish the current i0, whose magnitude is chosen to provide frequency tuning for the respective sensor mass. Because i0 is persistent, no current needs to flow in the pump leads (except initially to establish i0). The spring coil 702 is typically a thin film and the ballast coil 706, which has an inductance much smaller than that of the spring coil 702, is either a small thin film coil on the back of the spring coil or may simply consist of the stray inductance associated with the heat switch 704 and its leads.

The current i0 produces a static force. An external current i that is passed into the pump leads is splits proportionally to flow through both LF and LB so that the force can be modified that is generated by the current in trough the spring coil 702.

FIG. 22 (*c*) shows x- and y linear accelerometers 721 and 723, respectively. The accelerometers 721 and 723 comprise coils 722, 724 and 726, 728, respectively and generate currents ix and iy that are proportional to the linear acceleration of sensor masses positioned between pairs of the coils.

The generated currents ix and iy are directed to the above-described inductive coil circuitry 700 so that a force is generated by the spring coil 702 that is dependent on the currents generated by the accelerometers 721 and 723. FIG. 22 (d) shows a circuit diagram 720 that illustrates how currents may be injected into the spring coil 702.

The following will describe further details of electronic circuitry used in the gravity gradiometer 1.

FIG. 23 shows a schematic circuit diagram of a low noise amplifier according to a specific embodiment of the present invention. The low noise amplifier circuitry 366 is used to amplify the electrical signal generated by the transducer circuit 360 and to provide active feedback to control properties of the transducers and sensor masses 41 and 42.

The amplifier circuit 366 simulates an impedance $Z_L$ and an ohmic component of $Z_L$, provides active damping of resonant electrical signals generated by the constant charge capacitor component transducers 71a to 71e described above. The active damping reduces the Q-factor of the resonance and thereby increases the bandwidth within which the resonance can be generated. That electrical damping results in mechanical damping by generating electrostatic damping forces at the constant charge capacitor component transducers 71a-71e. Typically, the active damping is adjusted so that the gravity gradiometer has a bandwidth of the order of 1 Hz and the Q-factor of the active damping is close to 0.5.

The impedance $Z_L$ also has an imaginary component, which is dependent on a simulated capacitance $C_L$ in parallel with the simulated resistor $R_L$. The imaginary component actively controls the resonance frequency of the sensor masses 41 and 42 via the constant charge capacitor transducers 71a-71e by simulating a change of the "stiffness" of the pivotal coupling of the sensor masses 41 and 42 and thereby fine-tunes the resonance frequency of the sensor masses 41 and 42. As described above, the transducer circuit 360 is arranged so that resonant oscillations in which the sensor masses 41 and 42 oscillate in opposite directions result in an additive electrical signal. The simulated capacitance $C_L$ of the simulated impedance $Z_L$ allows fine tuning of the resonance and thereby further helps distinguishing that resonance oscillation from other common mode oscillations in which the sensor masses 41 and 42 oscillate in the same direction.

In this embodiment the amplifier circuit 366 provides "cold damping", which introduces very little thermal noise. Passive damping, such as damping using a conventional resistor, is avoided as this would result in thermal noise.

As described above, the constant charge component capacitors 71a-71e may combine sensing and actuator functions. The amplifier circuit 366 provides an active feedback loop between sensing and actuator functions and provides electronic feedback control of mechanical properties of the sensor masses 41 and 42.

The amplifier circuit 366 comprises an input 368 and an output 369. Further, the amplifier circuit 366 comprises a low-noise j-FET differential amplifier 370 and impedances Z1, Z2 and Z3. The low noise amplifier 370 has two input terminals 371 and 372 and the impedance $Z_1$ is connected between the output terminal 369 and the low noise amplifier input 371. The impedance $Z_2$ is connected between the output terminal 369 and the low noise amplifier input 372. The impedance $Z_3$ is connected between the terminal 372 and a common ground terminal 373.

The amplifier circuit 366 simulates the impedance $Z_L$ with $$Z_L \approx -\frac{Z_1 Z_3}{Z_2}. \qquad (eq. 1)$$

The amplifier 370 has noise matched resistance $$R_{opt} = \sqrt{\frac{S_V}{S_i}}.$$

The term $S_v$ is the spectral density of amplifier's voltage noise and the term $S_i$ is the spectral density of amplifier's current noise. In this embodiment the amplifiers noise matched resistance is a few 1 MΩ.

Further, the amplifier 370 has a noise temperature $$T_{opt} = \frac{\sqrt{S_V S_i}}{2k_B}$$

($k_B$: Bolzman constant) of less than 1K.

The noise density $S_\Gamma$ of the gradient error produced by thermal noise near resonance is given by $$S_\Gamma = \frac{4k_B T_{opt} 2\pi f_0}{m\lambda^2 Q_{act}} \qquad (eq. 2)$$

where λ is the radius of the gyration of the sensor masses 41 and 42 and $Q_{act}$ the effective Q-factor associated with the active damping, M is the mass of the sensor masses 41 and 42 and $f_o$ is the resonance frequency. The noise density $S_\Gamma$ is dependent on the noise of the amplifier and not on the physical temperature of the amplifier circuit, which allows "cold damping" and control of other mechanical properties without introducing significant thermal noise at normal operation temperatures such as at room temperature.

The component transducers 71a, 71b, 71g and 71h are also used to form angular accelerometers for measuring the angular movement of the mounting 5 so that feedback signals can be provided to compensate for that angular movement.

Figure 27:
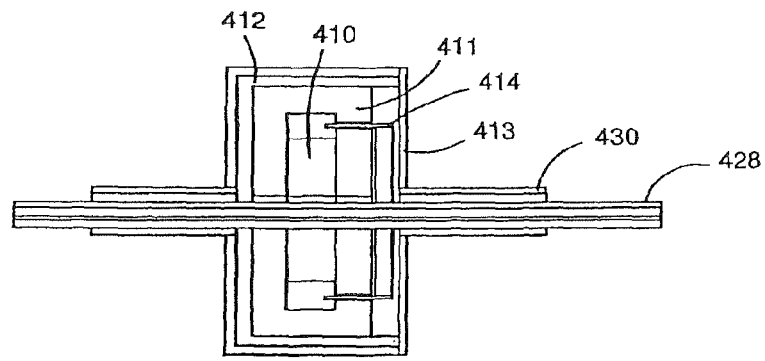
FIG. 27 is a cross-sectional perspective view through an actuator according to a specific embodiment of the invention.

FIG. 27 shows an actuator for receiving the control signals to adjust the mounting in response to angular movement of the mounting 5.

The actuator shown in FIG. 27 is also schematically shown in FIG. 8 by reference to numerals 53 and 54. The actuators are the same and FIG. 28 will be described with reference to the actuator 54.

The actuator 54 comprises in this embodiment a permanent NdFeB magnet 410, a soft iron core 411, a non-magnetic spacer 412 (aluminium, delrin), mumetal or permalloy housing 413, a voice coil assembly 414, a hollow rod 428 and a tube 430 that forms part of the housing 413 and in which the hollow rod 428 is rotatably mounted.

The voice coil assembly 414 is mounted onto rod 430 and the permanent magnet 410 and the soft iron core 411 are provided with internal bores through which the rod 430 penetrates so that the rod 430 with voice coil assembly 414 can move axially relative to the iron core 311 and the magnet 410. Electrical connections for the voice coil assembly 414 are fed through the hollow rod 430.

As described above, one or both of the sensor masses 41 and 42 can also be used as an angular accelerometer to provide a measure of angular movement of the mounting 5 so that appropriate feedback signals can be generated to compensation for that movement by control of the actuators previously described.

Figure 28:
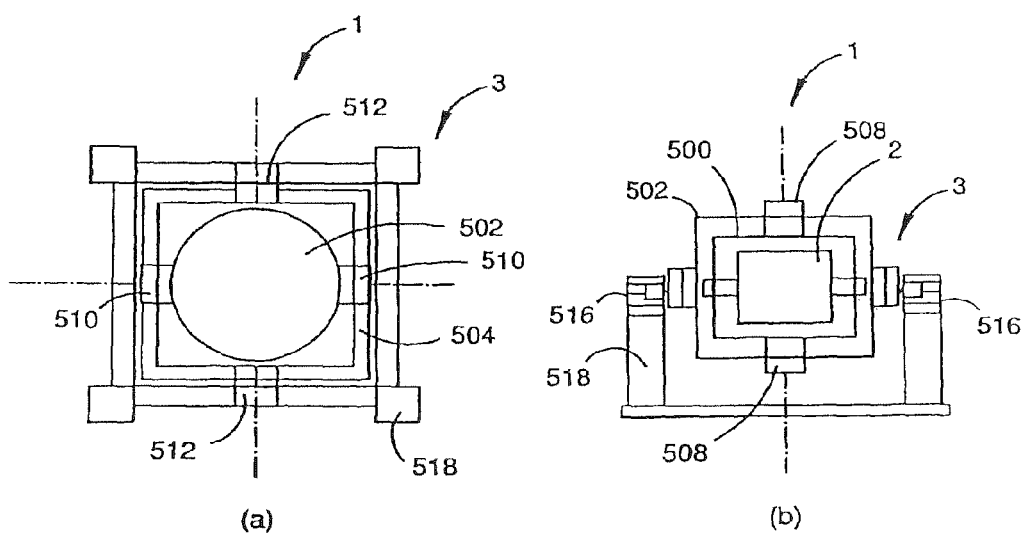
FIGS. 28 (a) and (b) shows components of the gravity gradiometer according to a specific embodiment of the present invention.

FIGS. 28 (a) and (b) show schematic plan and cross-sectional view of the gravity gradiometer 1. As indicated previously, the gravity gradiometer 1 comprises a housing 2 that is rotated by an external mounting about a z-axis. The external platform 3 comprises an inner stage 500 and an intermediate stage 502 and an outer stage 504. The housing 2 is mounted so that it is rotated with the inner stage 500 by z-drive 508 with bearings. The z-drive provides continuous rotation at a very stable speed. The rotational frequency is in this embodiment selectable between 0 and 20 Hz. The intermediate stage 502 including the inner stage 500 is rotable about the x-axis by x-drive 510, which includes bearings and the outer stage 504 is rotable with the intermediate stage 502 about the y-axis by y-axis drive 512 which also include suitable bearings. The outer stage with y-axis drive is mounted on springs 516 in a support frame 518.

The external platform 3 includes an IMU (inertial measurement unit), which contains gyroscopes, accelerometers, GPS receivers and a computer. The IMU is not shown in FIG. 28 (a) or (b). The IMU measures rotation about the x-, y- and z-axis and is coupled to drives in a feedback loop. This will be described below in more detail with reference to FIG. 29.

The external platform is arranged to gyro-stabilize the housing 2 about the x-, y- and z-axis with a gain factor of approximately 100 DC and a bandwidth of 20 Hz. This is achieved using the above-described 3-axis "gimbal" bearing arrangement with direct drive torque motors (508, 510 and 512). In this embodiment, fine-tuning of the motor drive for correction of rotation about the z-axis is achieved using the "common mode" signal provided by respective transducer components positioned within the housing 2.

Figure 29:
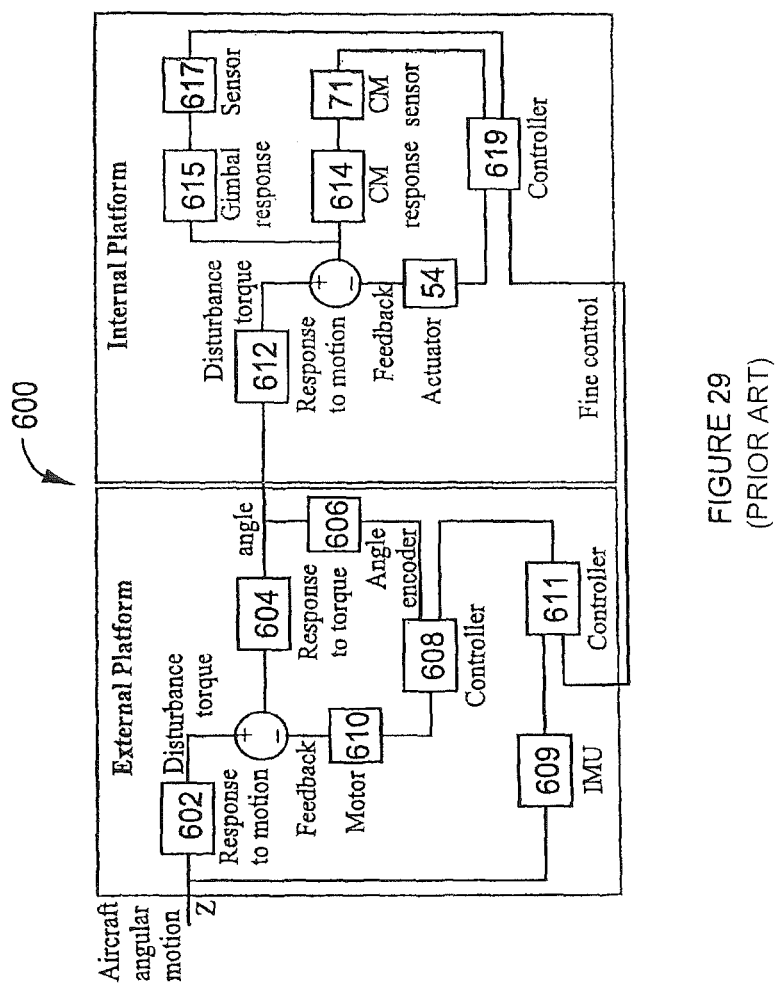
FIGS. 29 and 30 show block diagrams illustrating the operation of a rotatable support system according to a specific embodiment of the present invention.

FIG. 29 shows a block diagram 600 that illustrates how the common mode signal, generated within the housing 2 (which comprises the internal platform), is used for rotational z-axis correction of the external platform.

Blocks 602 and 604, labelled "response to motion" and "response to force" respectively, both represent the gimbal structure of the support structure 3. Each gimbal consists of three main components, namely a frame, a part supported by the frame via a bearing and an actuator which applies a torque (force) to this part. Each gimbal has two independent inputs, namely motion applied to the frame and a force applied directly to the part suspended by the frame. It has only one output, namely the angular position of the supported part and this responds differently to the two inputs.

Feedback force $F_e$ counteracts an external disturbance Z. This may be expressed by the following equation $$X_e = H_f F_e + H_z Z \qquad (eq. 3)$$

where $H_f$ and $H_z$ are constants.

Equation 3 may be written as $$X_e = H_f(F_e + K_z Z) \qquad (eq. 4)$$

where $K_e = H_z/H_f$.

The gravity gradiometer 1 is arranged for positioning in an aircraft. An external angular acceleration, such as an aircraft angular acceleration produces an equivalent torque $K_e Z$, which is counteracted by $F_e$ generated by the actuator 610. In FIG. 29 block 602 labelled "Response to motion" represents $K_e$ and block 604 labelled "Response to torque" represents $H_e$. In this embodiment, the external platform is arranged so that the torque Fe associated with a force generated by actuator 610 (labelled "Motor"). The external platform effects a reduction of an influence of an external angular acceleration, such as an angular aircraft acceleration, by a factor of 5-100, typically by a factor of 10, IMU 609 measures the external disturbance Z and directs a signal to controller 611, which in turn generates a command associated with the detected external disturbance Z. The command is converted in a feed forward arrangement into a compensation torque via further components, which form a feedback arrangement and which will be described below.

Response to torque 604 and sensor 606 (labelled "Encoder") also provide a signal (usually digital) which is associated with the external disturbance Z. This signal is directed to the controller 608 (also usually digital) and, also dependent on the command received from the controller 611 (see above), the actuator 610 generates a force that results in a compensation torque for compensating the disturbance Z. The actuator 610, the response to torque 604, the encoder 606 and the controller 608 are arranged in a feed-back arrangement.

The internal platform may be represented in a similar manner and block 612 labelled "response to motion" represents the z-axis gimbal structure within the housing 2. The block 614 labelled "CM response" represents a response to a torque associated with the external disturbance Z experienced by the sensor masses 41 and 42. The transducer sensors 71 and the actuator 54 have been described above. Blocks 615 and 617, labelled "gimbal response" and gimbal sensor" respectively, represent a response of the inner gimbal structure and a resultant gimbal position, respectively. For example, the gimbal sensor 617 may be provided in the form of an optical shadow sensor that may be positioned at a location that is fixed relative to one of the housing portions 45 and 47.

In this embodiment, the internal platform is arranged to reduce any remaining impact by the external disturbance Z further. A compensation torque generated by the internal platform has a first component torque that is controlled by a feed-forward arrangement or feed-forward like arrangement and a second component torque that is controlled by a feed-back arrangement. The feed-back arrangement results in a reduction of an impact of an angular aircraft acceleration by a factor of $10^2$ to $10^3$ and the feed-forward like arrangement results in a reduction of an impact of an angular aircraft acceleration by a factor of the order of 10.

Gimbal sensor 617, which is a displacement sensor, generates a signal associated with the external disturbance Z and the generated signal is then directed to controller 619. The actuator 54 generates a force that results in the first component torque and counteracts the external disturbance Z. The first component torque is dependent on both the sensed external disturbance Z and a response parameter that is a measure for a mechanical responsiveness of the mechanical components that are moved by the actuator 54.

In this embodiment the mechanical components include all components that are positioned inside the housing 2 (excluding the actuator 54 and excluding flexure web 31). These mechanical components are directly or indirectly coupled to the housing 2 by flexure web 31 and the mechanical responsiveness of these mechanical components is dependent on an equivalent spring constant of the flexure web 31 and a response the mechanical components to an applied force. The displacement sensor 617 senses a displacement of these mechanical components relative to the housing 2. The mechanical responsiveness is experimentally predetermined by measuring a ratio of a compensation torque and an applied acceleration which the compensation torque compensates. In this embodiment the sensor 617, the controller 619 and the actuator 54 form a feed-forward control arrangement (or a feed-forward-like control arrangement) in which the actuator 54, during operation of the gravity gradiometer, generates a torque that is dependent on the experimentally determined mechanical responsiveness.

Sensors 71 provide a signal which is representative of the angular position of the sensor masses 41 and 42. This signal is directed to the controller 619 and to the actuator 54, which then generates a force that results in the second component torque. In this embodiment, the sensors 71, the controller 619 and the actuator 54 are arranged in a feed-back arrangement.

The internal platform is arranged so that a remaining influence of the external disturbance Z is further reduced by the described feed-forward or feed-forward-like arrangement and the again reduced by the described feed-back arrangement.

In the above-described embodiment the gravity gradiometer 1 is arranged so that rotation about the z-axis is controlled by the external platform to a fixed uniform rotation speed. The input signal for controlling the motion is provided by the IMU 609 and the sensor 606. However, the IMU 609 and the sensor 606 typically only have limited accuracy at higher frequencies and to improve the z-axis rotational correction further, an angular acceleration derived from the above-described "Common Mode" signal from the internal transducer sensors 71 is used for fine-tuning. As described above, the same signal is also used inside the internal platform in a feedback loop to stabilise the instrument against applied angular acceleration (via the actuator 54). The specification for this internal feedback system is stringent and to ease this requirement, some of the burden is transferred to the external platform in that manner.

Figure 30:
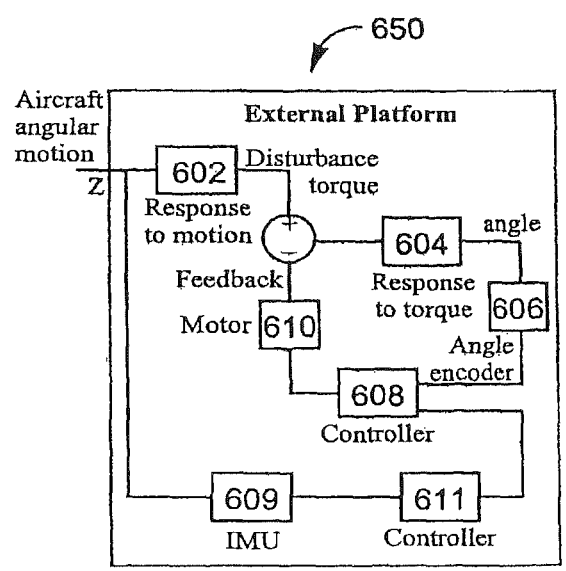

FIG. 30 shows a block diagram 650 that illustrates stabilisation (no rotation) about the x- and y-axis, which is performed exclusively by the external platform. All elements of FIG. 30 were already described above and function in an analogous manner to inhibit rotation about the x- and y-axes.

It is to be appreciated by those skilled in the art that the invention may be embodied in many other forms. For example, the transducers may not necessarily be provided in the form of constant charge capacitors, but may be provided in the form of any other suitable type of capacitor including those that do not allow simulation of a virtual capacitor. Further, it is to be appreciated that the amplifier circuitry 366 shown in FIG. 24 is only one embodiment and a variety of variations from the described embodiment are possible.

Although the previous examples relate to embodiments operating at room temperature, embodiments may operate at superconducting temperatures. Embodiments of this type are described in PCT international application numbers PCT/AU2007/001179 or PCT/AU2006/001273, which are incorporated by reference. The following will describe components of the gravity gradiometer in accordance with the disclosure of PCT international application number PCT/AU2007/001179.

Figure 31:
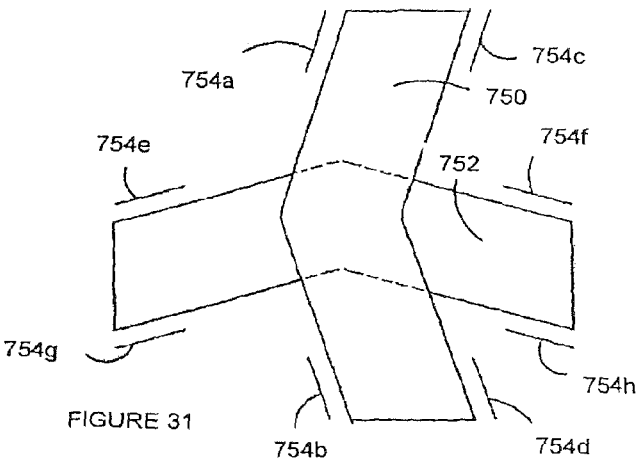
FIGS. 31-38 show components of a gravity gradiometer in accordance with a further embodiment of the present invention.

FIG. 31 is a diagram of the bars 750 and 752 showing them in their "in use" configuration. The transducers which are located in the openings 305 are shown by reference numbers 754a to 754e to equate to the circuit diagrams of FIGS. 32 and 33.

Figure 32:
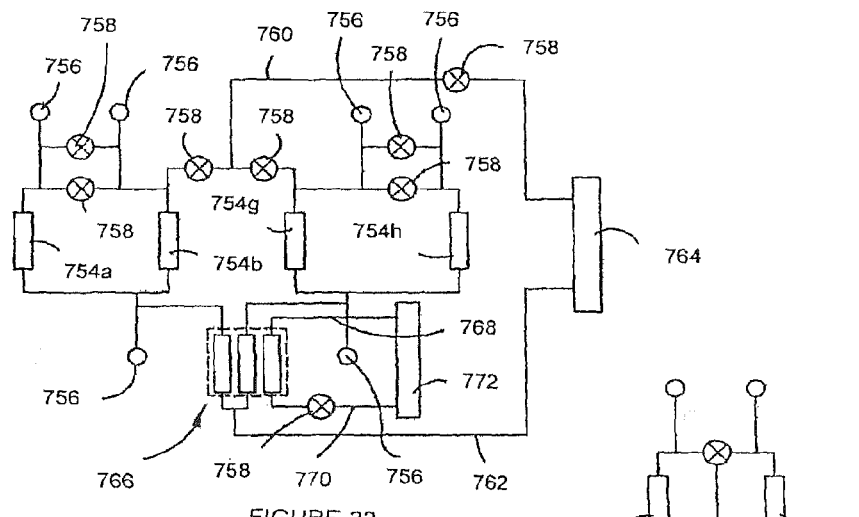
Figure 33:
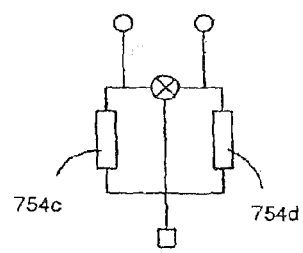

With reference to FIGS. 32 and 33, transducers 754a and 754b associated with the bar 750, and transducers 754g and 754e associated with the bar 752 are used to provide the gravity gradient measurements. Input terminals 756 provide input current to the superconducting circuits shown in FIG. 32. Heat switches which may be in the form of resistors 758 are provided which are used to initially set the superconducting current within the circuit. The heat switches 758 are initially turned on for a very short period of time to heat those parts of the circuit at which the resistors 758 are located to stop those parts of the circuit from superconducting. Currents can then be imposed on the superconducting circuit and when the heat switches formed by the resistors 758 are switched off, the relevant parts of the circuit again become superconducting so that the current can circulate through the circuits subject to any change caused by movement of the bars 750 and 752 under the influence of the gravity gradient and angular acceleration, as will be described hereinafter.

The transducers 754a, 754b, 754g and 754e are connected in parallel to circuit line 760 and to circuit line 762 which connect to a SQUID 764.

Thus, as the bars 750 and 752 rotate about their respective flexure web, the bars 750 and 752, for example, come closer to the transducer 754a and therefore further away from the transducer 754b, and closer to the transducer 7Ih and further away from the transducer 754g respectively. This therefore changes the current flowing through the transducers and those currents are effectively subtracted to provide signals for providing a measure of the gravity gradient.

As is shown in FIG. 33, transducers 754c and 754d form a separate circuit and are used for frequency tuning of the bar 750 and transducers 754a and 754b. Similarly, the transducers 754e and 754f are used for frequency tuning of the bar 752 and the transducers 754g and 754h. Frequency tuning of the bars is important because the bars should be identical in order to reject angular accelerations. The frequency tuning circuits therefore enable electronic tuning of the bars to match resonant frequencies and to achieve mode rejection so that each of the bars does function in an identical manner.

The transducers 754a, 754b, 754g and 754h are also used to form angular accelerometers for measuring the angular movement of the mounting 5 so that feedback signals can be provided to compensate for that angular movement.

To do this, the line 762 is connected to a transformer 766. The polarity of the signals from the transducers 754a and 754b and 754g and 754h are reversed so that the output of the transducer 766 on lines 768 and 770 is an addition of the signals rather than a subtraction, as is the case when the gradient is measured so the addition of the signals gives a measure of the angular movement of the bars. The outputs 768 and 770 are connected to SQUID device 772 for providing a measure of the angular acceleration which can be used in the circuit of FIG. 10 to provide compensation signals to stabilise the mounting 5.

Thus, according to the preferred embodiment of the invention, the angular accelerometers 90° provide a measurement of angular acceleration, for example, around the x and y axes, and the angular accelerometer formed by the bars 750 and 752 and the transducers 754a, 754b, 754g and

754h provide a measure of the angular accelerometer around the, for example, z axis.

Figure 34:
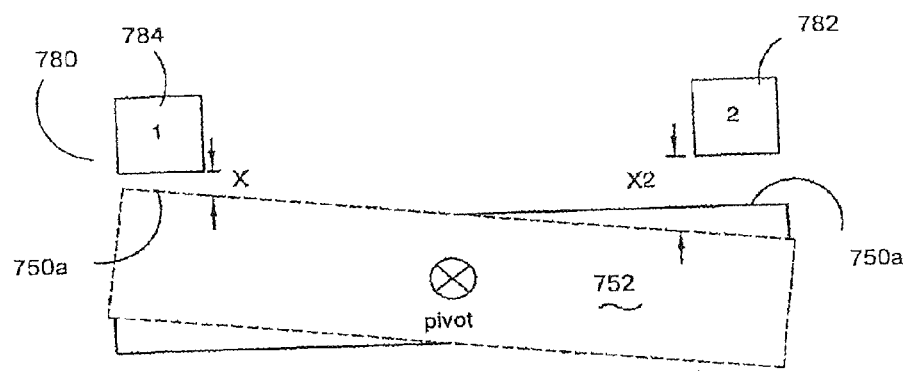
Figure 35:
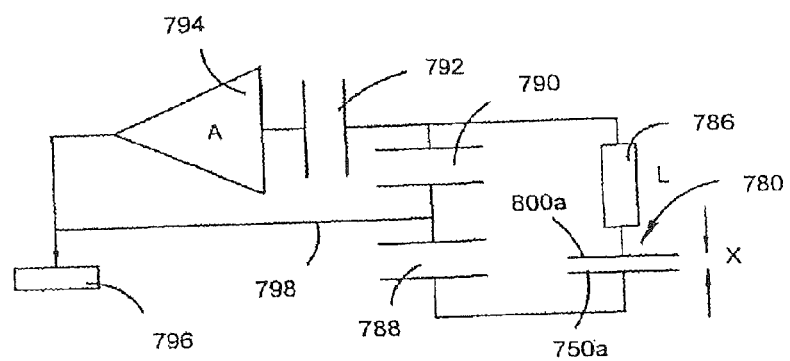

With reference to FIGS. 34 and 35, the manner in which the balance of the bars 750 and 752 is achieved will be described. A pair of displacement sensors formed by capacitors 780 and 782 are provided for two main purposes:

1. To measure the residual linear acceleration sensitivity of each bar 750 (and 752) to enable the bars to be mechanically balanced using a grub screw, before operation at low temperatures; and 2. To measure the induced linear acceleration sensitivity of each bar 750 and 752.

The capacitor 780 is formed by a capacitor plate 800a and the surface 750a of the bar 750. A second circuit the same as that shown in FIG. 35 is used to measure the change experienced by the capacitor 782. That circuit is the same as FIG. 34 except the capacitor 780 is replaced by the capacitor 782 which is formed by a capacitor plate and surface 750a relating to another of the transducers 754.

Figure 38:
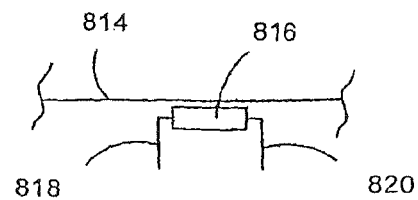

The bars 750 and 752, in their respective housings, are rotated in a jig (not shown) through 360°. This provides an acceleration range of 2 $g_E$, which is typically 100 times greater than the accelerations which may be conveniently applied at low temperature. A typically requirement is for the capacitors 780 and 782 to be able to detect 0.1 run over a period of 1 to 20 minutes. A pair of capacitors 780 and 782 is required for each bar to provide some discrimination against sensor drift, since rotation of the bar 750 will cause one capacitor 780 to increase and the other capacitor 782 to decrease by the same amount, as is shown in FIG. 38, whereas thermal expansion will cause both outputs of the capacitors 780 and 782 to increase.

The capacitors 780 and 782 remain in place, even though they are unusable at low temperatures, and therefore their components need to be non-magnetic so as to not interfere with the operation of the gradiometer and, in particular, its nearby superconducting circuitry. FIG. 34 shows that as the bar 750 pivots, the gap applicable to the capacitor 780 decreases and the gap of the capacitor 782 increases.

The capacitors 780 and 782 are formed by the face 750a of the bar 750 (and the corresponding face on the other bar 752) and second plates 784 which are spaced from the face 750a. The gap between the plates of the respective capacitors 780 and 782 must typically be resolved to about 1 ppm.

The capacitor 780 forms a high Q-factor resonant circuit with inductor 786. The inductor 786 and capacitor 780 are provided parallel to capacitors 788 and 790 and connect via capacitor 792 to an amplifier 794. The output of the amplifier 794 is provided to a frequency counter 796 and also fed back between the capacitors 790 and 788 by line 798. The capacitor 780 therefore determines the operating frequency of the amplifier 794 which can be read to a high precision.

If the bar 750 is out of balance, the frequency counter 45 will tend to drift because of the imbalance of the bar. This can be adjusted by moving the grub screws 301 into and out of the masses as previously described until balance takes place. The amplifier 794 can then be disconnected from the frequency counter 796 so that the gradiometer can be arranged within the Dewar 1 with the other parts of the circuits shown in FIG. 35 in place.

Figure 36:
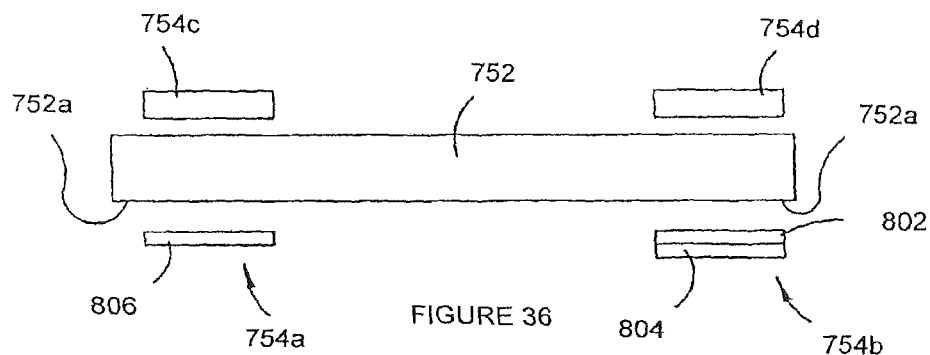
Figure 37:
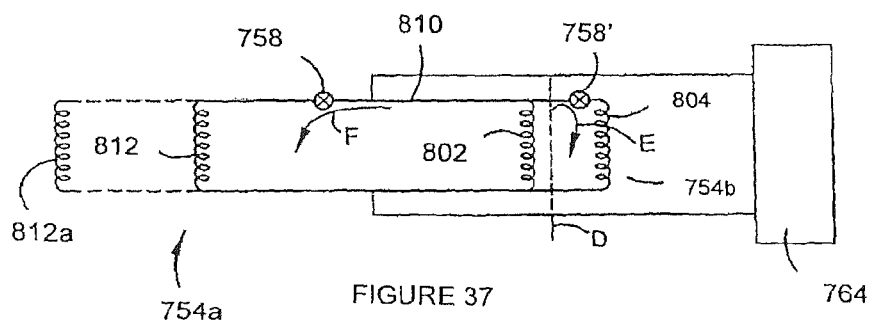

FIGS. 36 and 37 show the physical configuration and circuit diagram of one of the measurement bars (i.e. bar 752) and a circuit diagram respectively which illustrate tuning of the effective spacing of the sensor coil of each transducer with respect to the edge 752a of the bar 752. In the embodiments shown, the transducer 754b is provided with two coils 802 and 804. The coils 802 and 804 are separated by a space of about 1 mm. Heat switch 758 is provided in the loop formed by the coils 802 and 804 and the coil 812 of the transducer 754a at the other end of the bar 752. In order to ensure that the coils 812 and 802 are spaced at equal distance from the surfaces 752a of the bar 752, the current flowing through the loop formed by the coils 802, 804 and 812 is proportioned between the coils 802 and 804 to form a virtual coil at, for instance, the location D shown in FIG. 37. By changing the proportion of the current which flows through the coils 802 and 804, the position D changes between the coils to form an effective virtual coil at that position. Thus, if the coils 802 and 812 are not equally spaced from their respective surfaces 752a, the current induced in the loop can be altered to in turn alter the amount of current which flows through each of the coils 802 and 804 to adjust the position D and therefore the virtual location of a single coil formed from the coils 802 and 804 until the spacing matches that of the coil 812.

If desired, the coil 812 could be replaced by a double coil arrangement the same as that which forms the transducer 754b shown in FIG. 37. A coarse coil forming a transformer may be provided to step up the current which is supplied to the SQUID device 764. For ease of illustration, the additional coil 511 and the other componentry is not shown.

As previously explained, the SQUID 764 is initially tuned by inducing a current into the loop formed by the coils 802 and 812. This is achieved by supplying current to the heating resistor 758 which forms a heat pump to elevate the part of the loop at the position of the resistor 758 to warm that part of the circuit above superconducting transition so that part of the circuit no longer super-conducts. Thus, a current can be supplied into the loop from, for example, inputs 517 and which are not shown in FIG. 37, so that current circulates through the loop and the current supply connected to the input terminals. The heating resistor 758 is then deactivated so that the part of the circuit again becomes super-conducting and the current supply is disconnected from the loop so that the current induced in the loop continues to circulate through the loop under super-conducting conditions.

To proportion the current through the coils 802 and 804, a further heat switch 758' is provided which enables a current to be induced in the loop formed by the coils 802 and 804 which can travel in the direction of arrow E in FIG. 37. The current induced by the heat switch 758 circulates in the direction of arrow F. Therefore, the amount of current which passes through the coil 802 can be altered compared to that which passes through the coil 804, thereby shifting the position D of the virtual coil formed by the coils 802 and 804. Thus, the spacing of the coils so that the spacing of the coil 802 and the coil 812 are the same is electronically achieved.

That current is proportionally passed through the coils 802 and 804 to set the virtual position of the coil 802 at position D if necessary, so that the coils 812 and 501 are effectively spaced from the surfaces 752a by precisely the same distance. As the bar 752 moves under the influence of the gravity gradient, the coils 812 and 802 will therefore move relative to the surfaces 752a, changing the induced current passing through those coils which in turn is sensed by the SQUID device 764 to provide a measure of the movement and therefore of the gravity gradient experienced by the bar 752.

The coils 812 and 802 enable angular motion to be distinguished from lateral motion. Any lateral movement of the bar 752 to the right or left in FIG. 38 will produce the same effect on both coils, whereas an angular movement under the influence of the gravity gradient will cause one end of the bar 752 to move closer to its corresponding coil and the other end to move further away from its coil.

FIGS. 29 and 30 shows block diagrams illustrating the operation of motion stabilisation circuitries with respect to the gravity gradiometer 1. If the gravity gradiometer is a superconducting device, the device typically is not rotated about the z-axis. In this case motion compensation is conducted for rotation about the x, y and z-axis. Consequently, the superconducting device comprises 3 circuitries, each analogous to those illustrated in FIGS. 29 and 30 and arranged to counteract motion about one of the x, y and z-axes.

In addition, the gravity gradiometer may be arranged for measuring other components of the gravity gradient, in which case the gravity gradiometer would not be arranged for operation in the described orientation. For example, the gravity gradiometer may be arranged to measure the $\Gamma_{yz}$ and $(\Gamma_{zz}-\Gamma_{yy})$ or $\Gamma_{xz}$ and $(\Gamma_{zz}-\Gamma_{yy})$ of the gravity gradient.

The reference that is being made to PCT publication number PCT application numbers PCT/AU2006/001269, PCT/AU2007/001179 PCT/AU2007/001276 does not constitute an admission that these documents form a part of the common general knowledge in Australia or in any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The claims defining the invention are as follows:

1. A gravity gradiometer comprising:
   a detector for detecting a gravity gradient, the detector comprising at least two movable sensor masses and being arranged for rotation about an axis, the detector being arranged to generate a signal in response to a change in the gravity gradient, wherein the at least two sensor masses form an Orthogonal Quadruple Responder (OQR) and experience a change in torque in response to the change in the gravity gradient whereby the at least two sensor masses move relative to each other and wherein the signal is indicative of the relative movement of the at least two sensor masses;
   a support structure for supporting the detector in an aircraft and comprising a component that is arranged to reduce transmission of an aircraft acceleration to the detector, the support structure comprises a first support structure component and a second support structure component and wherein the first support structure component is arranged to support the second support structure component, wherein one of the first and second support structure components is arranged to reduce an influence of the aircraft acceleration on the signal by a factor of at least $10^1$ and the other one of the first and second support structure components is arranged to reduce an influence of the aircraft acceleration on the signal by a factor of at least $10^2$; and further,
   wherein the at least two sensor masses are arranged to reduce the influence of the aircraft acceleration on the signal by a factor in the range of $1\times10$-$1\times10^4$.

2. The gravity gradiometer of claim 1, wherein the support structure comprises a feed-back control arrangement that is arranged to reduce the influence of the aircraft acceleration on the signal by a factor of at least $10^2$.

3. The gravity gradiometer of claim 2, wherein the support structure comprises a feed-forward control arrangement that is arranged to reduce the influence of the aircraft acceleration on the signal by a factor of at least 5.

4. The gravity gradiometer of claim 1, wherein the support structure comprises a feed-back control arrangement that is arranged to reduce the influence of the aircraft acceleration on the signal by a factor of at least $10^3$.

5. The gravity gradiometer as claimed in claim 1, wherein the at least one sensor element and the support structure together are arranged to reduce the influence of the aircraft acceleration on the signal by a factor of at least $5\times10^7$.

6. The gravity gradiometer as claimed in claim 1, wherein the at least one sensor element and the support structure together are arranged to reduce the influence of the aircraft acceleration on the signal by a factor of at least $10^8$.

7. The gravity gradiometer as claimed in claim 1, wherein the sensor masses are arranged for rotation about an axis and wherein the sensor masses are arranged so that a centre of mass of the sensor masses is within 10 nm of the axis.

8. The gravity gradiometer as claimed in claim 7, wherein the sensor masses are arranged so that a centre of mass of the sensor masses is located within 5 nm of the axis.

9. The gravity gradiometer as claimed in claim 1, comprising an acceleration sensor for sensing an acceleration and an actuator for generating a force as a function of both the sensed acceleration and an adjustment parameter that is dependent on a mechanical responsiveness of a detector component to an applied force, the detector component including the detector, the actuator being arranged to apply a generated force such that an influence of the aircraft acceleration on the signal is reduced.

10. The gravity gradiometer as claimed in claim 9, comprising a further acceleration sensor for sensing the acceleration and wherein the actuator is further arranged to generate a force in response to the acceleration sensed by the further acceleration sensor and wherein the further acceleration sensor and the actuator are arranged in a feed-back arrangement.

11. The gravity gradiometer as claimed in claim 9, comprising a further acceleration sensor for sensing the acceleration and a further actuator for generating a force in response to the acceleration sensed by the further acceleration sensor and wherein the further acceleration sensor and the further actuator are arranged in a feed-back arrangement.

12. The gravity gradiometer as claimed in claim 1, wherein the aircraft acceleration comprises a linear acceleration component.

13. The gravity gradiometer as claimed in claim 12, wherein the at least two movable sensor masses are balanced to reduce an influence of the linear aircraft acceleration component on the signal by a factor of at least $10^6$ when the gravity gradiometer is airborne and exposed to the aircraft acceleration.

14. The gravity gradiometer as claimed in claim 13, wherein the at least two movable sensor masses are balanced to reduce an influence of the linear aircraft acceleration component on the signal by a factor of at least $10^7$ when the gravity gradiometer is airborne and exposed to the aircraft acceleration.

15. The gravity gradiometer as claimed in claim 1, wherein the aircraft acceleration comprises linear and angular acceleration components.

16. The gravity gradiometer as claimed in claim 1, wherein the at least two sensor masses are arranged to reduce the influence of the aircraft acceleration on the signal by a factor of at least $10^4$.

* * * * *